(12) United States Patent
Alon

(10) Patent No.: US 8,102,302 B2
(45) Date of Patent: Jan. 24, 2012

(54) MODE 5 DETECTION PROCESS USING PHASE AND AMPLITUDE CORRELATION

(75) Inventor: Yair Alon, Thousand Oaks, CA (US)

(73) Assignee: Northrop Grumman Guidance & Electronics Company, Inc., Los Angeles, CA (US)

( * ) Notice: Subject to any disclaimer, the term of this patent is extended or adjusted under 35 U.S.C. 154(b) by 5 days.

(21) Appl. No.: 12/784,299

(22) Filed: May 20, 2010

(65) Prior Publication Data

US 2011/0285572 A1 Nov. 24, 2011

(51) Int. Cl.
*G01S 13/00* (2006.01)
(52) U.S. Cl. .......................................... 342/36; 342/30
(58) Field of Classification Search ..................... 342/30
See application file for complete search history.

(56) References Cited

U.S. PATENT DOCUMENTS

| 4,653,069 A * | 3/1987 | Roeder ........................... 380/31 |
| 5,089,822 A * | 2/1992 | Abaunza et al. ................ 342/30 |
| 5,425,058 A * | 6/1995 | Mui ............................... 375/336 |

* cited by examiner

*Primary Examiner* — Timothy A Brainard
(74) *Attorney, Agent, or Firm* — Lynn & Lynn

(57) ABSTRACT

A receiver in a mode 5 air traffic control system provides amplitude and phase signal outputs a digital data stream containing preamble and flight information from data transmitted from an aircraft. A signal splitter divides the amplitude and phase signal outputs between an odd channel and an even channel that carry odd-numbered pulses and even-numbered pulses, respectively. An odd channel data decoder connected to the signal splitter extracts signals encoded in the odd channel and forms an odd data stream and an even channel data decoder connected to the signal splitter extracts signals encoded in the even channel and forming an even data stream. A preamble correlator correlates the odd and even data streams with a predefined preamble mask to detect potential valid preambles, and preamble decision logic processes signals output from the preamble correlator to identify which of the preambles actually are actually valid.

12 Claims, 13 Drawing Sheets

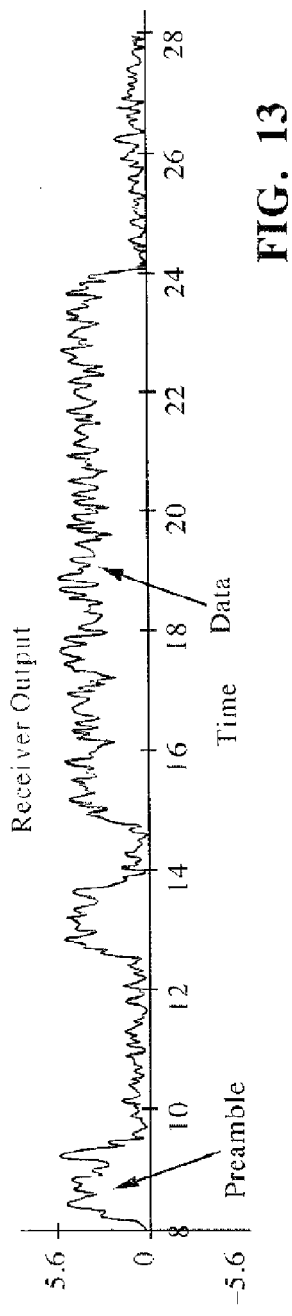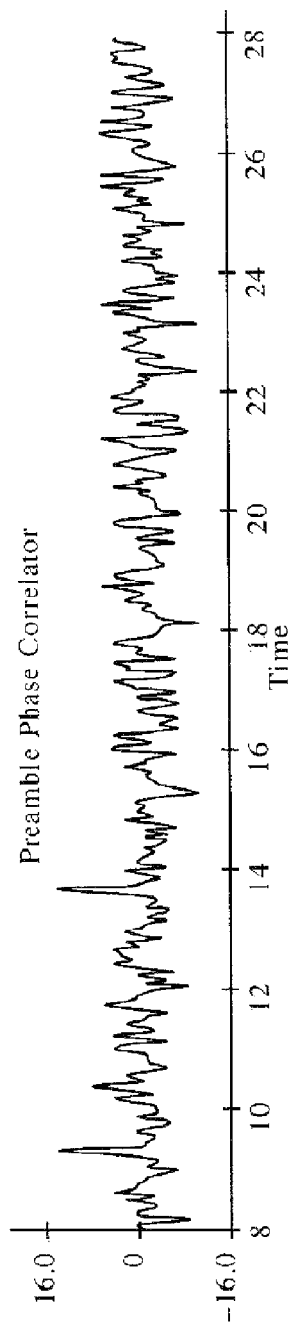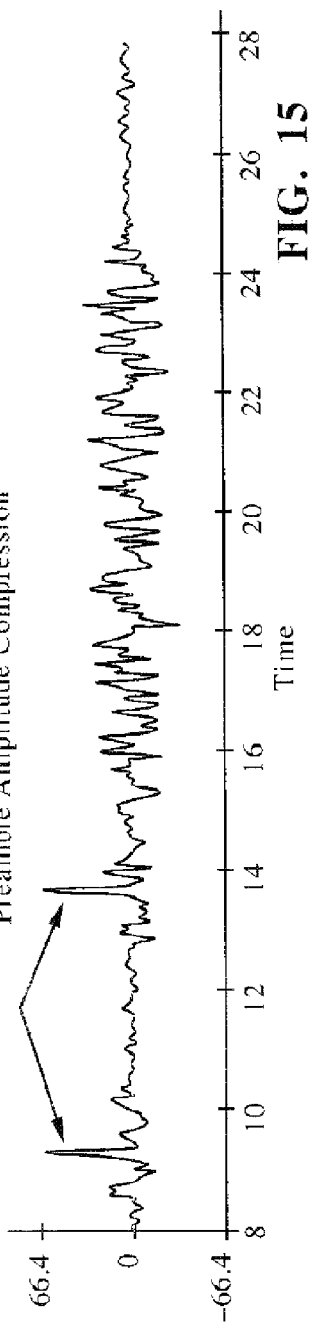
FIG. 13
FIG. 14
FIG. 15

MODE 5 DETECTION PROCESS USING PHASE AND AMPLITUDE CORRELATION

BACKGROUND OF THE INVENTION

This invention relates generally to techniques for using secondary surveillance radar to identify and determine the location of a target such as an aircraft.

Secondary Surveillance Radar (SSR) is a radar system used in air traffic control (ATC). SSR not only detects and measures the position of aircraft, but also requests additional information from the aircraft itself such as its identity and altitude. Primary radar systems measure only the range and bearing of targets by detecting reflected radio signals, which is somewhat like seeing an object in a beam of light. SSR relies on its targets being equipped with a radar transponder that replies to each interrogation signal by transmitting its own response containing encoded data. SSR is based on military Identification Friend or Foe (IFF) technology originally developed during the Second World War, and the two systems are still compatible today. The system has evolved such that the term "identify friend or foe" (IFF) commonly refers to all modes of SSR operation, including civil and foreign aircraft use.

The SSR antenna is used to transmit the interrogation calls and to receive the aircraft data. Military and commercial aircraft have transponders that automatically respond to a signal from the secondary surveillance radar interrogation with an identification code and altitude. The code is a predetermined message in response to a predefined interrogation signal. Before an aircraft begins a flight, it receives a transponder code from an air traffic controller. Normally only one code will be assigned for the entire flight. These codes are sometimes called mode codes. The range to the target is calculated from the time delay between the interrogation and the response time. Thus the SSR system provides for friendly aircraft, all the data that primary radar can provide, and more.

The transponder on an aircraft has an omni-directional antenna so that it can receive and reply to a radar signal from any direction. The transponder receives the signals from the interrogator and selectively replies with a specific pulse group (code) only to those interrogations being received on the mode to which the transponder is set. These replies are independent of primary radar returns, which are received from the target "skin" return. The replies processed by the SSR interrogator for display are sometimes called "plots." The radarscope used by air traffic control personnel displays returns from both the primary radar system and the secondary radar system. These returns are what the controller refers to in the control and separation of air traffic.

The transponder used in SSR is a radio receiver and transmitter that receives on one frequency (1030 MHz) and transmits on another frequency (1090 MHz). This type of transponder is called a cross-band beacon. The target aircraft's transponder replies to signals from an interrogator (usually, but not necessarily, a ground station co-located with a primary radar) by transmitting a coded reply signal containing the requested information. SSR continuously transmits interrogation pulses as its antenna rotates, or is electronically scanned in space. The reply sent depends on the mode of interrogation. The aircraft is then displayed as a tagged icon on the controller's radar screen at the calculated bearing and range. An aircraft without an operating transponder still may be observed by primary radar, but would be displayed to the controller without the benefit of SSR derived data.

Both the civilian SSR and the military IFF have become much more complex than their wartime ancestors, but remain compatible with each other. One reason for this compatibility is to allow military aircraft to operate in civil airspace. SSR can now provide much more detailed information, and it also permits the exchange of data directly between aircraft for collision avoidance. Given its primary military role of reliably identifying friends, IFF has much more secure (encrypted) messages to prevent 'spoofing' by the enemy, and also is used on all kinds of military platforms including air, sea and land vehicles.

There are several transponder modes, each offering different information. Mode 1 provides 2-digit 5-bit mission code (military only—cockpit selectable). Mode 2 provides 4-digit octal unit code (military only—either set on the ground or changed in flight depending on the particular aircraft type). Mode 3/A provides a 4-digit octal identification code for the aircraft, known as a squawk code, assigned by the air traffic controller (military and civilian). Mode 4 provides a 3-pulse reply to a coded challenge (military only). Modes B and D, although originally defined, have never been used for civil ATC purposes.

For civilian flights the modes of operations are A, C and S. Mode S is a relatively new IFF procedure for both military and civilian air traffic control that includes transmission of other data in addition to the mode code. The A mode is based on a 4-digit code using numbers between 0 and 7 assigned by the air traffic controller and set by the pilot to enable identification and monitoring. Mode C transmits pressure altitude that is read automatically from the aircraft altimeter. Mode S is triggered by a mode-S interrogation and can provide the particular information that is requested by the interrogation signal. For modes A and C, all aircraft receiving the interrogation signal will reply, whereas mode S allows aircraft to be addressed individually. In modern ATC systems the data appears with alphanumeric characters in a tag or label linked to the flight position symbol on the radar screen.

Mode 5 provides encryption to provide secure transmission of automatic dependent surveillance broadcast (ADS-B) and GPS position (military only). Mode 5 IFF systems allow for much more sophisticated data exchanges between the interrogator and transponder than other modes allow and have encryption of both the interrogation and the response. With longer interrogation sequences and reply sequences, and improved encryption techniques, the possibility of breaking the encryption by monitoring the communications is greatly reduced.

The level of a transponder is an important feature. The level reports the capabilities of the transponder. A level 1 transponder is one with basic surveillance capabilities. A level 1 transponder will have no provision for datalink capabilities or extended length messaging. A level 2 transponder has all the features of a level 1 transponder with capabilities for Airborne Collision Avoidance System (ACAS), ground station request for altitude and ground station request for the airframe identity. Most transponders installed today are level 2 capable.

SUMMARY OF THE INVENTION

The present invention is directed to an improved mode 5 air traffic control system that includes phase and amplitude correlation of received radar signals. An air traffic control system according to the present invention for processing a digital data stream containing a preamble and flight information data transmitted from an aircraft comprises a receiver for receiving digital radar signals from an aircraft. The receiver is arranged to provide amplitude and phase signal output, a signal splitter arranged to divide the amplitude and phase signal outputs from the receiver between an odd channel and an even channel that are arranged to carry a set of odd-numbered pulses and a set of even-numbered pulses, respectively.

The present invention further includes an odd channel data decoder connected to the signal splitter for extracting from signals encoded in the odd channel and forming an odd data stream and an even channel data decoder connected to the signal splitter for extracting data from signals encoded in the even channel and forming an even data stream. A preamble correlator connected to the odd and even channel decoders for correlating the odd and even data streams with a predefined preamble mask and detecting potential valid preambles, and preamble decision logic is arranged to process signals output from the preamble correlator and identify which of the potential valid preambles actually are valid.

The air traffic control system according to the present invention may also further comprise an odd channel differential phase detector in the odd channel between the signal splitter and the odd channel data decoder and an even channel differential phase detector in the even channel between the signal splitter and the even channel data decoder.

The preamble correlator included in the air traffic control system according to the present invention may comprise an odd channel amplitude correlator having a first input connected to the signal splitter to receive signals that indicate the odd channel amplitude and a second input connected to the odd channel data decoder to receive decoded odd signals, the odd amplitude correlator being arranged to produce an odd amplitude correlator sum signal, an odd phase correlator connected to the odd channel data decoder to receive signals that indicate the phase of odd channel signals, the odd phase correlator being arranged to produce an odd phase correlator sum signal, an even channel amplitude correlator having a first input connected to the signal splitter to receive signals that indicate the even channel amplitude and a second input connected to the even channel data decoder to receive decoded even signals, the even amplitude correlator being arranged to produce an even amplitude correlator sum signal; and an even phase correlator connected to the even channel data decoder to receive signals that indicate the phase of even channel signals, the even phase correlator being arranged to produce an even phase correlator sum signal.

The air traffic control system according to the present invention may further comprise a reply path sidelobe suppression and monopulse radar signal processing circuit connected to the preamble decision logic and to the receiver for suppressing preambles generated by sidelobes in the data stream and for generating monopulse radar data.

The air traffic control system according to the present invention preferably further comprises a Walsh data correlator system for identifying data in the even and odd channels and deciding which channel has the best data to be used for further processing.

BRIEF DESCRIPTION OF THE DRAWINGS

FIG. 13 graphically illustrates signals output from an external receiver that may be included in the system of FIG. 1;

FIG. 14 graphically illustrates signals output from the preamble phase correlator of FIG. 5;

FIG. 15 graphically illustrates signals output from the preamble compression system of FIG. 6;

DETAILED DESCRIPTION OF THE INVENTION

Figure 1:
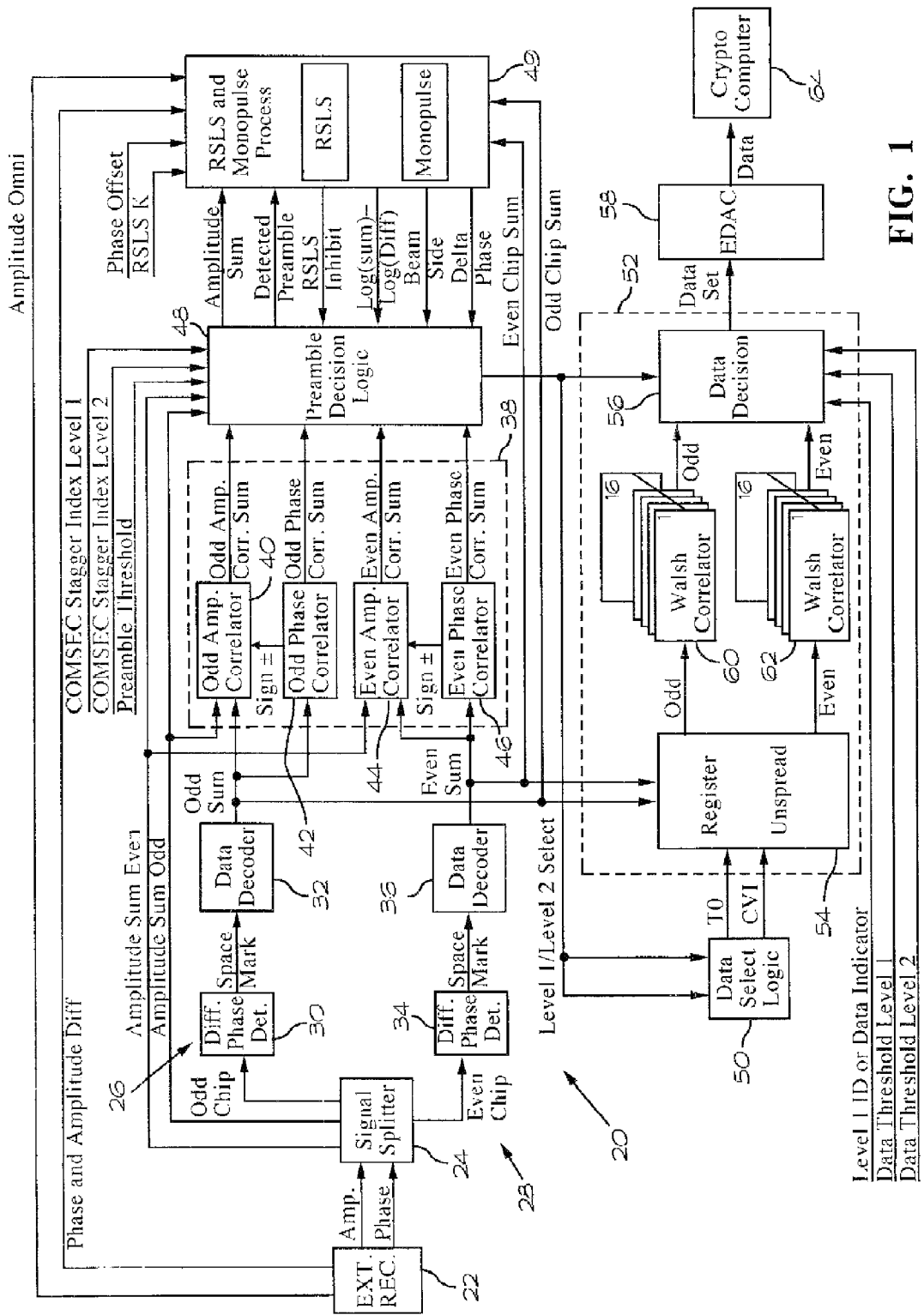
FIG. 1 is a block diagram of a mode 5 detection system according to the present invention.

Referring to FIG. 1, a mode 5 detection system 20 according to the present invention includes an external receiver 22 arranged to receive radar signals from a radar transponder (not shown) in a manner well-known in the art. Typically the transponder is aboard an aircraft (not shown).

The mode 5 detection system 20 includes the following interfaces:
1. Amplitude SUM—The receiver output amplitude SUM signal comprises up to 16 bits of linear data at 32 MHz sampling rate.
2. Phase SUM—The receiver output phase SUM data comprises 8 bits of linear phase distribution at 32 MHz rate.
3. Amplitude OMNI—The receiver output amplitude OMNI signal comprises up to 16 bits of linear data at 32 MHz sampling rate.
4. Amplitude DIFF—receiver output phase DIFF data comprises up to 16 bits of linear data at 32 MHz rate.
5. Phase DIFF—The receiver output phase SUM data comprises 8 bits of linear phase distribution at 32 MHz rate.

The mode 5 detection system 20 includes two threshold settings, a preamble threshold that adjusts the internal data test false alarm rate, and level 1 and level 2 data thresholds that set the final data false alarm rate for level 1 and level 2. The threshold setting are:
1. Preamble threshold—The preamble threshold is value ranging from 8 to 16 in steps of 2 that sets the thresholds for the preamble starts. At a setting of 12 (default setting) the level 1 preamble false alarm rate is about 5000.

2. Data threshold level 1—The data threshold level 1 controls the final data false alarm rate. For a threshold setting level 1 of 90 and preamble threshold setting of 12, the data false alarm probability is about $8\times10^{-3}$ or 1.28 false alarms per second.

3. Data threshold level 2—The data threshold level 2 controls the final data false alarm rate. For a threshold setting level 2 of 160 and a preamble threshold setting of 12, the data false alarm probability is about $4\times10^{-8}$ or 0.6 false alarms per second.

The mode 5 detection system 20 includes the following controls:

1. Phase Offset—This is a phase correction signal reported from the system that offset the Delta Phase reported by the system to be centered at 0 or 180 degrees. The Phase Offset is calculated in a close loop process using a target of opportunity.

2. Communications Security (COMSEC) Stagger Index Level 1—This index is determined by the preamble stagger index level 1, which is set every interrogation time and is used to select the level 1 preamble stagger from the level 1 stagger table 150. All legitimate targets detected at this interrogation time will use this stagger, allowing the system to reject transponders reports from other interrogators.

3. COMSEC Stagger Index Level 2—This index is determined by the preamble stagger index level 2, which is set every Code Validation Interval (CVI) by the system. All targets detected during this CVI time will use this stagger times for the P3, P2 and P1 pulses. Since the CVI time is changed independently by the interrogator and transponder the detector must evaluate the previous and the future CVI for preamble detection. Thus the current, previous and future index must be stored.

4. COMSEC Spreading Index Level 1—This index is determined by the spreading function index, which is set every interrogation time, provides a unique data spreading for all level 1 reports received during this interrogation. The spreading function is extracted from a table of 256 spreading functions stored in the detector.

5. COMSEC Spreading Index Level 2—This index is determined by the spreading function index, which is set every CVI time, provides a unique data spreading for all level 2 reports received during this CVI. The spreading function is extracted from a table of 256 spreading functions stored in the detector. However, since the CVI is changed independently in the transponder and interrogator, it is possible that the report will use the previous or the next CVI. The preamble detection that search for all possible CVI's identify which CVI is to be used for the current target, selecting the proper index. Thus the current, previous and future index must be stored for use in all time.

6. Level 1 Data or ID—This is an indicator telling the detector what type of level 1 response is expected, Data or ID.

7. RSLSK—This is a reply path side lobe suppression (RSLS) threshold setting for target to be reported as coming from the main beam or sidelobe.

The mode 5 detection system 20 provides the following data:

1. Overlay code—The overlay code is received every level 1 interrogation time and is used to for the decoding of level 1 nine bit data symbols as received from a crypto computer (not shown) that is used to encrypt and decrypt data.

2. Data to crypto computer—The level and level 2 data, following an error detection and correction (EDAC), are reported to the CRYPTO for data descrambling. Decrypted Data is received from the cryptographic computer.

3. Report is a Mode 5 message report that contains the mode 5 data including azimuth and flags.

The receiver 22 inputs 32 MHz base band digital data that indicates phase and amplitude of a radar signal to a signal splitter 24. FIG. 13 illustrates a typical signal output from the external receiver 22. The signal has a first portion known as the preamble and a second portion that includes a data set. The signal splitter 24 divides the 32 MHz sample data into two 16 MHz data sets that are designated as "odd" and "even," respectively, and processed in separate channels 26 and 28, respectively.

Due to the 32 MHz sample random position relative to the signal phase transition it is possible that one of the channels 26 or 28 may provide a better detection probability than the other during each detection sequence (detection of the preamble and data set). This is most noticeable during phase transition. Depending on the start sampling point relative to the phase change, one of the split process channels 26 or 28 output may report no phase change at some phase transitions while the other channel will have maximum phase change. In order to identify which is the best channel to be used for each data set, the system 20 processes the Even and Odd samples in parallel to determine a data correlation score for each set. By applying a correlation process on both channels 26 and 28, the best channel for that signal input can be selected for the detection process. The final selection of the best channel is deferred to the end of the process where the highest data correlation score is available.

The odd channel 26 includes a differential phase detector 30 that receives data from the signal splitter 24. Signals output from the differential phase detector 30 are input to a data decoder 32. The channel 28 includes a differential phase detector 34 that receives data from the signal splitter 24. Signals output from the differential phase detector 34 are input to a data decoder 36. The differential phase detector 34 and the data decoder 36 preferably are formed to be identical to the differential phase detector 30 and the data decoder 32, respectively.

The differential phase detectors 30 and 34 process the Even and Odd sampled data at 16 MHz per channel and detect Mark and Space values in the data. Ideally the phase difference between consecutive chips is expected to be $\pm90°$. However, due to noise and Inter Symbol Interference (ISI), the actual phase difference expected is an arbitrary $\Delta\theta$ that may be less than the maximum 90 degrees. When the phase difference is positive a Space (1) is declared. A negative azimuth value will be reported as Mark (0).

The outputs of the phase detectors 30 and 34 are processed by the differential data decoders 32 and 36 to extract the encoded transponder data set. It is executed by using a delay where each new chip sample k is the exclusive OR (XOR) of the new incoming chip sample and the previous output chip. This process generates the original code or the inverse of the original code (depending on the value of the first bit, which may be arbitrary "1" or "0").

Signals output from the data decoders 32 and 36 are input to a preamble correlator 38. The preamble correlator 38 includes an odd amplitude correlator 40 and an odd phase correlator 42. The preamble correlator 38 also includes an even amplitude correlator 44 and an even phase correlator 46. Signals output from the data decoders 32 are input to the odd amplitude correlator 40 and to the odd phase correlator 42.

The odd amplitude correlator 40 also receives an amplitude SUM odd signal from the signal splitter 24. Signals output from the data decoder 36 are input to the even amplitude correlator 44 and into the even phase correlator 46. The even amplitude correlator 44 also receives an amplitude SUM even signal from the signal splitter 24. The preamble correlator 38 processes the incoming data and detects the level 1 and level 2 preamble pulses, which may be negative or positive. Since the data decoders 32 and 36 generate the code or the inverse of that code, successful correlation is declared when the absolute value of the correlation crosses a predefined threshold.

Signals output from the odd amplitude correlator 40, the odd phase correlator 42, the even amplitude correlator 44 and the even phase correlator 46 are input to a preamble decision logic circuit 48. The preamble decision logic circuit 48 also receives a preamble threshold signal and signals that indicate preamble stagger time for levels 1 and 2. The outputs of the preamble correlator 38 are processed by the preamble decision logic 48, which evaluates the preamble correlator output for proper preamble detection. For that, the current preamble time stagger index for level 1 and level 2 identifies the current expected stagger position. The stagger values are extracted from a local table that stores all the preamble data for level 1 and level 2 stagger time values. When the preamble correlation level is above the set threshold and if the preamble spacing meets the expected stagger time, a preamble set is detected. When the set meets the level 1 requirements of two preamble detection or if at least 3 out of 4 preambles are detected that meet the level 2 spacing requirements, a data set start, T0, is declared. Since level 2 stagger time is changed every Code Validation Interval (CVI), the level 2 stagger test is performed for the current CVI, the previous CVI and the next expected CVI. The result of the level 2 preamble test identifies which CVI is currently used by the transponder (level 1 preamble stagger is known since it is initiated by the interrogator every interrogation).

The preamble correlator 38 correlates the incoming data stream with a pre-defined preamble mask and detects potential preambles. The process is performed independently on the Odd and the Even channels, and a success is declared when a preamble is detected in any of these channels. The correlation function contains two processes, phase only correlation and phase amplitude correlation that are integrated to generate the preamble decision output.

The phase only correlators 40 and 46 perform the correlations on the differential phase detector data and provide a stable amplitude independent constant false alarm rate (CFAR). It allows the system to generate reliable preamble triggers that can be used to activate the data detection process. The CFAR process achieved by the phase correlators 40 and 46 maintains a constant false alarm rate in all noise levels as if an amplitude limiter were implemented in the CFAR process. However, the phase only correlation process has no amplitude data that is needed for RSLS and the level 1 monopulse process.

The phase correlation uses the differential phase detector data and the amplitude data to generate an amplitude dependent "compressed" signal. It provides the full 16 chips processed gain (PG) amplitude data needed for reliable RSLS and monopulse functions. The amplitude signal could be used also for the CFAR process, but having amplitude dependant signal for CFAR requires noise amplitude estimators that need to be adjusted for noise, jamming and interference. The phase correlators 40 and 46 are used for the preamble detection and to record the phase amplitude channel data only when the preamble detection is declared.

The preamble decision logic circuit 48 sends the outputs of the Odd and Even SUM channels 26 and 28, respectively, to a reply path side lobe suppression (RSLS) and monopulse circuit 49 that also receives the OMNI and DIFF radar amplitude signals. Using the SUM chips set and the preamble known fixed code, the OMNI and DIFF preamble signals are compressed and a correlated Process Gain (PG) signal is now available for the monopulse and RSLS function. First, the RSLS test is performed; and if a preamble fails the RSLS test, the preamble is eliminated from the system. If a sufficient number of preambles is rejected, the data set associated with this preamble set is ignored.

The monopulse data is extracted from the OMNI and DIFF compressed signals for level 1 and level 2. It is possible that the level 2 monopulse may not be needed since the target location is part of the level 2 report. However, the level 2 monopulse is extracted for possible future usage. For each preamble that passes the RSLS test, the monopulse data is calculated by the RSLS and Monopulse Process function 49. This data set, which contains the logarithmic SUM minus logarithmic DIFF, the beam side signal and the delta phase associated with this beam side are reported back to the preamble decision logic 38 and stored there. When the preamble decision logic 48 identifies a set of level 1 or level 2 preambles, the final monopulse data is calculated from the individual monopulse data stored in each preamble using proper averaging and logic selections process. This monopulse data will be reported with the data set. The RSLS and monopulse circuit 49 also provides an RSLS inhibit signal and a delta phase signal to the preamble decision logic circuit 48.

The preamble decision logic circuit 48 also provides signals to a data selection logic circuit 50 and to a Walsh correlator system 52. The data selection logic 50 provides the necessary delay and sets the timing for starting the Walsh data correlator 52.

The Walsh correlator system 52 includes a register 54, a data decision circuit 56 and an error detection and correction circuit (EDAC) 58. The register 54 outputs an odd data signal and an even data signal. The odd data signal is input to a first Walsh data correlator set 60 that is connected between the register 54 and the data decision circuit 56. The even data signal is input to a second Walsh data correlator set 62 that is connected between the register 54 and the data decision circuit 56. The first and second Walsh data correlator sets 60 and 62 preferably each include sixteen correlators each. The data selection logic circuit 50 provides signals that are input to the register 54 in Walsh correlator system 52. The data decision circuit 56 also receives data indicator and data threshold signals. Each correlator contains the appropriate Walsh function that is used to identify one of 16 possible data symbols. The input data set, marked by the T0 pulse indicating the start of data, is first unspread, symbol by symbol, using a spreading function from the list of spreading functions available. For level 1, the spreading function is the one pointed by the COMSEC spreading index received from the system. The level 2 spreading index is selected by the CVI reported from the preamble detection, indicating which spreading index shall be used for the current data set.

Each data symbol is now correlated with all 16 Walsh correlators, and the highest correlation value identifies the 4 data bits stored in that specific symbol. The process is repeated for all symbols, for the Odd and Even function and for plus and minus one chip start from the current T0 mark. All the six data sets, the correlation sum and the associated correlation value for each symbol are stored in local memory. Once all symbols are correlated, the best set is identified as being the one with the highest correlation sum. The final data detection decision is done in the Data Decision function that accepts the data if its correlation sum is above the Data Threshold Level as set by the system. If accepted, this data set is now available to the EDAC function.

The EDAC process 58 is executed only on level 2 data sets. When a level 2 report is identified, and the data set passes the level 2 data threshold test, a group of eleven symbols at a time are send to the EDAC process 58. The EDAC process 58 evaluates the data set and makes the determination if this data needs a single error correction or dual error correction (Erasure Process) or none. If errors are detected, the EDAC process 58 corrects the error and overwrites the eleven-symbol data set with the corrected values. This process is repeated for all three sets of eleven symbols each. The corrected data is now reported to a cryptographic computer 64 for proper decryption.

Suitable structures for the components the mode 5 detection system 20 of FIG. 1 are described with reference to FIGS. 2-13.

Signal Splitter 24

Figure 2:
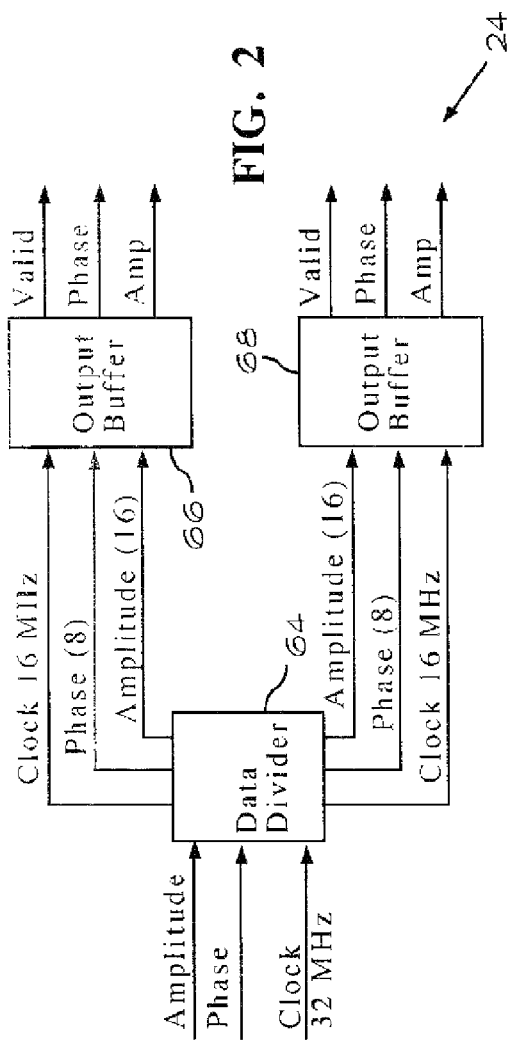
FIG. 2 is a block diagram of a signal splitter that may be included in the system of FIG. 1.

Referring to FIG. 2, the signal splitter 24 includes a data divider 64 arranged to receive a 16-bit amplitude signal and an 8-bit phase signal from the external receiver 22. The data divider 64 also receives a 32 MHz clock signal. The data divider 64 processes the input amplitude data, the phase data to generate 16 bit odd amplitude data and 8 bit odd phase data for the Odd channel 26 and to generate the 16 bit even amplitude data and 8 bit even phase data for the Even channel 28. The data divider 64 also divides the 32 MHz clock signal input into 16 MHz clock signals for each of the Odd and Even channels 26 and 26, respectively.

An output buffer 66 receives the odd amplitude signal, the odd phase signal and one of the 16 MHz clock signals from the data divider 64. An output buffer 68 that preferably is identical to the output buffer 66 receives the even amplitude signal, the even phase signal and the other 16 MHz clock signal from the data divider 64. Each of the output buffers 66 and 68 maintains valid data when a corresponding Valid Clock is set.

Differential Phase Detectors 30 and 34

Figure 3:
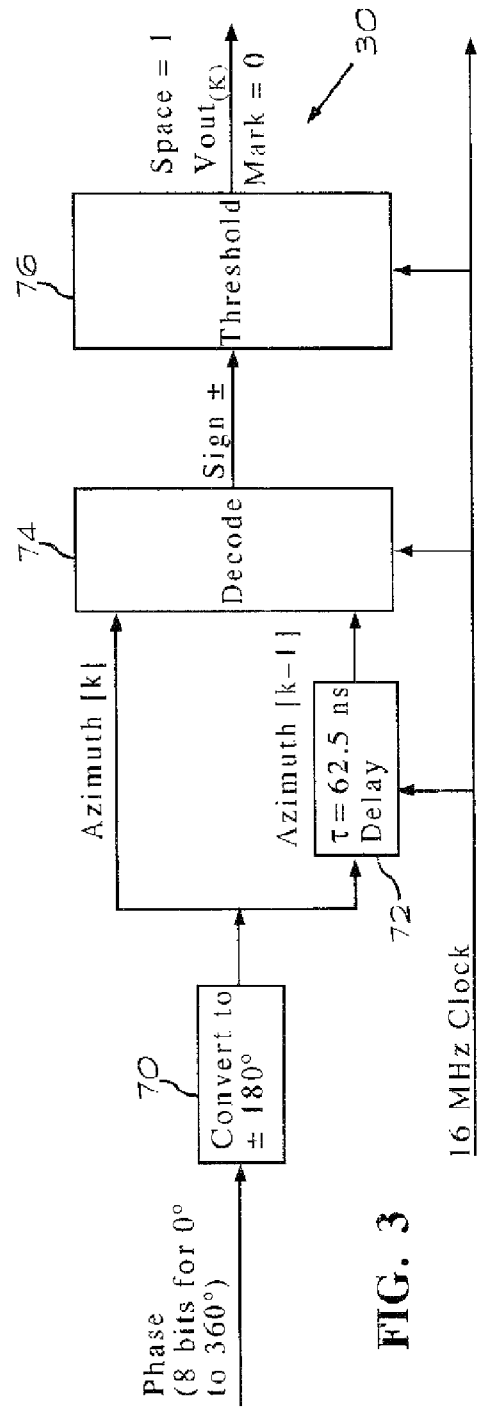
FIG. 3 is a block diagram a differential phase detector that may be included in the invention as shown in FIG. 1.

Referring to FIG. 3, the differential phase detector 30 generates Mark and Space signals for the Odd channel 26. It is to be understood that the differential phase detector 34 is preferably formed to be identical to the differential phase detector 30. Therefore, only the differential phase detector 30 is described in detail herein. The 8-bit phase signal output from the output buffer 66 is input to a phase converter 70. The output of the phase converter 70 is input to a delay circuit 72 that delays the signal by a time $\tau$. The output of the delay circuit 72 and the output of the phase converter 70 are input to a decoder 74 that sums the two signals input thereto. The decoder 74 output is input to a threshold circuit 76.

Each new incoming chip phase, which is reported by the splitter 24 at 0° to 360°, is converted to ±180°. This chip phase is delayed by one chip time of 1/16 MHz, which corresponds to a delay time of $\tau$=62.5 ns. The decoder 74 subtracts the previous chip phase from the new incoming chip phase while maintaining phase continuity over the full 360° range and finds the sign of the difference, which can be negative or positive. This phase sign transition is used for generating the Mark and Space signals. Since during one chip time the signal "travels" 90 degrees in positive direction (Space) or in negative direction (Mark), the sign, plus or minus, can be clearly extracted.

The differential phase detectors 30 and 34 process the even and odd sampled data at 16 MHz per channel and detect the Mark and Space values. Ideally the phase difference between consecutive chips is ±90 degrees. However, due to noise and Inter Symbol Interference (ISI) the actual phase different expected is an arbitrary value $\Delta\theta$ that may be less than the maximum 90 degrees. When the phase difference is positive, a Space (1) is declared. A negative azimuth value will be reported as Mark (0).

The phase detector logic equation is structured for the phase detector output $S_K$ is given as:

The conversion to ±180 degrees:

if (Azimuth[k]>180°)

Azimuth[k]=Azimuth[k]−360°

To maintain phase continuity the phase difference decoder operates on the ±180 degrees and must perform the following function:

DeltaAz[k]=Azimuth[k]−Azimuth[k−1]

if (DeltaAz[k]>180°)

DeltaAz[k]=DeltaAz[k]−360°;

If (Deltas[k]<−180°)

Deltas[k]=Deltas[k]+360°;

The phase detector output is given by:

If (Deltas[k]>=0)

PhaseDetOut[k]=1;

else

PhaseDetOut[k]=0;

Data Decoders 32 and 36

Figure 4:
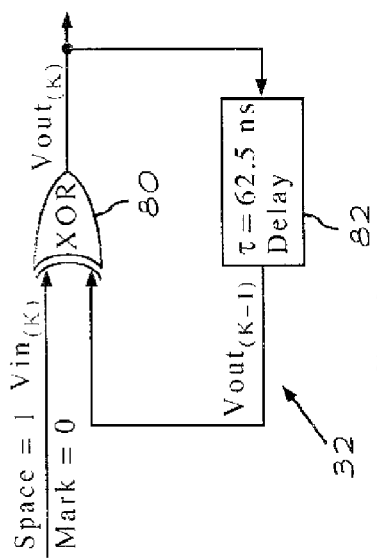
FIG. 4 is a block diagram of a data decoder that may be included in the system of FIG. 1.

The data decoders 32 and 36 operate on the Space and Mark signals output by the differential phase detectors 30 and 34, respectively, to extract the original data as was encoded by a differential data encoder (not shown) in the aircraft's transponder. Referring to FIG. 4, the data decoder 32 includes an exclusive OR (XOR) gate 80 that receives a signal $V_{in}(k)$ that indicates Space=1 and Mark=0. An exclusive OR is a logical operation on two operands that results in a logical value of True if, and only if, exactly one of the operands has a value of True. The output at sample k is the XOR of the input with the previous output. The XOR gate 80 produces a signal $V_{out}(k)$ that is input to a delay circuit 82. The delay circuit 82 produces a signal $V_{out}(k-1)$ that is fed back into an input of the XOR gate 80 for combination with the input $V_{in}(k)$. The logic function for the data decoder 32 is $$Vout_{(K)}=Vin_{(K)}(XOR)Vout_{(K-1)}$$

The output function is the decoded data. Due to the arbitrary "0" or "1" nature of the chip prior to the first data chip the decoder 32 may produce the original data, or the inverse of the original data. As a result, the search process for preamble and data must look for correlation with the data or with its inverse.

Preamble Phase Correlation Process

Figure 5:
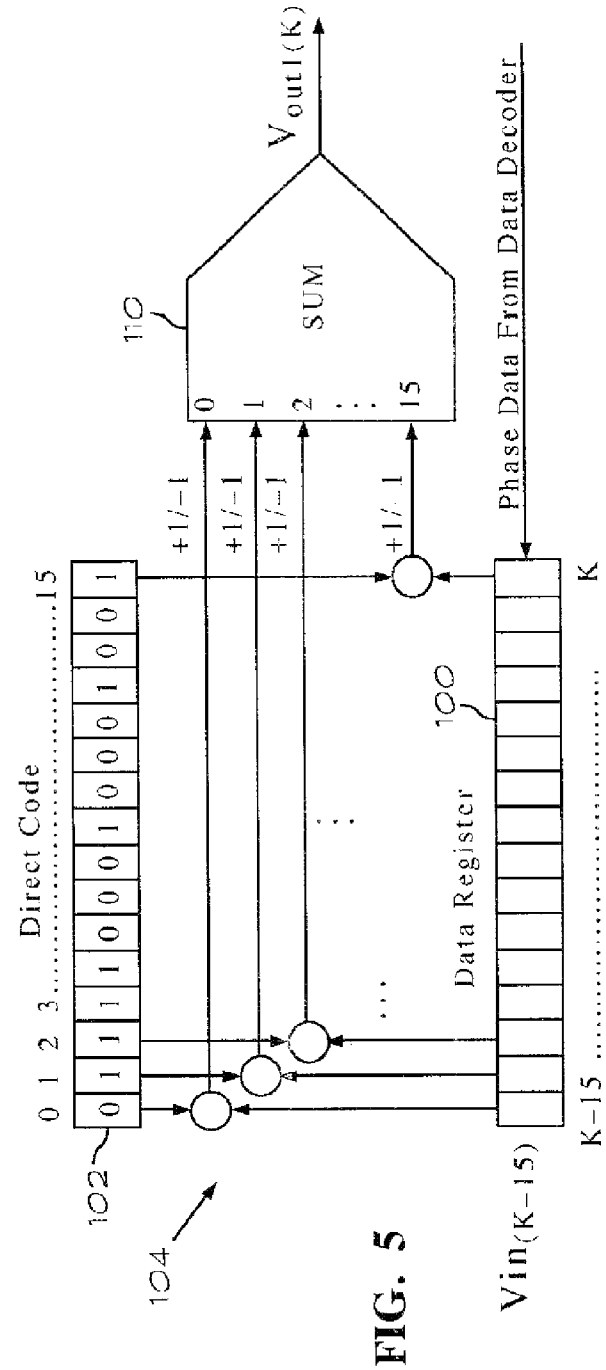
FIG. 5 is a block diagram of a channel of a correlator that may be included in the system of FIG. 1.

FIG. 5 illustrates one channel of the preamble phase correlation process. The preamble phase correlation process utilizes the data decoder output and a predefined mask to extract the preamble data from the noise. FIG. 14 illustrates signals output from the preamble phase correlator. The data decoder 0/1 data bits are stored in a 16-bit long FIFO register 100 and are cross correlated with a preset code such as 0111 1000 1000 1001 stored in a correlator 102. An exclusive OR gate array 104 is connected between the FIFO register 100 and the correlator 102. The exclusive OR array 104 has outputs connected to a summer 110. The correlation function is essentially a multiply and sum process where each data chip cell is compared to the code, and the result is set to plus one (+1) when the data cell matches and minus one (−1) when the data is different. The correlation result is the sum of all cells results. The signal output $Vout_{(K)}$ from the summer 110 may be written as:

$$Vout_{(K)} = \sum_{i=0}^{15} V_{DATA(k-i)}(XOR')V_{CODE(15-i)}$$

Where $V_{DATA(i)}$=The phase data (1/0) stored in each cell in the data register;

$V_{CODE(i)}$=The code data (1/0) stored in each cell Direct or Inverse Code register; and XOR'=a modified XOR function where the output is +1 when the code and data in the cell matches and −1 when no match exists.

The correlator output for exact match is a positive number 16 when the input signal and the correlator code are equal and a negative number −16 when the data is inversed by one of the data decoders 32 or 36. Thus, in order to detect both conditions, the test must be done for both the positive and the negative values.

The phase correlator is amplitude independent and will maintain the same false alarm rate at all noise amplitude levels, and by applying proper threshold the preamble decision can be done. The calculated and measured preamble false alarm rates and the resulting preamble detection probability as function of the threshold setting and S/N are given below.

Preamble Phase Correlation False Alarm and Detection Probability

When a signal is applied to the preamble correlator 38, and the correlation function attempts to find the preamble code using the correlation function given above. The threshold at which correlation is declared as successful is a function of the required false alarm rate calculated here.

The binomial probability P(k) that exactly k successful correlations out of n attempts is given as:

$$P_k(k) = \frac{n! p^k (1-p)^{n-k}}{(n-k)! k!}$$

Where p=single chip detection probability.

In case of noise, p is the probability of getting the correct "0" or "1" chip as stored in the correlator. For noise p=0.5. For a signal, p is the probability of having the correct chip, and it is a function of the signal to noise ratio and the Inter Symbol Interference (ISI).

For a single symbol of n=16 chips and for the case that for at least K chips successful correlation is achieved, the probability of correlation is the cumulative probability of all probabilities from K to n (number of chips).

$$P_1(K) = \sum_{k=K}^{n} P_k(k)$$

Since each preamble test is performed on 2 parallel channels (Even and Odd); and successful preamble detection is declared when at least one channel is detected, the probability of detecting a preamble symbol is:

$P_{S1} = 1 - [1 - P_1(K)]^2$.

Successful detection is declared when the set of symbols is successfully detected. Level 1 requires that if the P2 symbol is detected, the P1 symbol must be detected at least at one of the 3 positions defined by CVI, CVI+1 and CVI−1 and at least in one of the expected cell, current cell k, cell k−1 and cell k+1 (to protect for a single cell position change). Thus, P1 is tested in 9 possible positions $P_{S2} = 1 - [1 - P_{S1}]^9$ The level 1 detection probability is given as:

$P = P_{S1} * P_{S2}$

The setting of K defines the system false alarm rate. For K out of 16 correct correlations (K matches and 16−K unmatched) the correlator output will be K−(16−K).

For K=14 (14 out of the 16 chips are matched, or correlator threshold set to 12) the noise false alarm, P, is measured by the simulator to be 0.000323 which equates, for a 16 MHz sampling rate, to about 5100 false reports per second. When K is selected to 15, the measure false alarm probability is $6.6 \times 10^{-6}$; and the false alarm rate is reduced to about 105 per second.

The level 2 preamble detection process is similar to the level 1 process except that detection is declared if three out of four preambles are successfully detected. Thus preamble detection probability is the sum of probabilities of detecting the first preamble and two out of the other three preambles plus the probability of detecting the first preamble and three out of three of the other preamble plus the probability of not detecting the first preamble and detecting the second preamble and the last two preambles. Since the probability of detecting first preamble is Ps1 and any other preamble is Ps2 (reflecting the 3 CVI position tested and plus and minus of the expected cell) the probability P is:

$P = P_{S1} 3 P_{S2}^2 (1 - P_{S2}) + P_{S1} * P_{S2}^3 + (1 - P_{S1}) P_{S1} * P_{S2}^2$

This approach assumes that no special sorting is done on the preambles and reports from all different CVI are eligible for start of detection process.

The mode 5 detection process receives the receiver base band data and extracts the preambles and the data symbol for level 1 and level 2 detection. The detection is done at the 16 MHz chip rate defined by the mode 5 Minimum Shift Key (MSK) modulation (well-known in the art) and it utilizes a set threshold to maintain constant false alarm rate (CFAR) in all noise conditions. Once a signal crosses the preamble threshold, the detector utilizes a search function that evaluates the data for possible preambles existing in all other locations as defined by the level 1 and level 2 preamble setting. When a preamble set is detected, the data that follows this preamble is processed; and if it passes the data threshold, the data is extracted and reported to the system. The level 1 and level 2 preamble detection probabilities Pd is a function of S/N and the K setting.

Preamble Phase Amplitude Correlation (Amplitude Compression)

Figure 6:
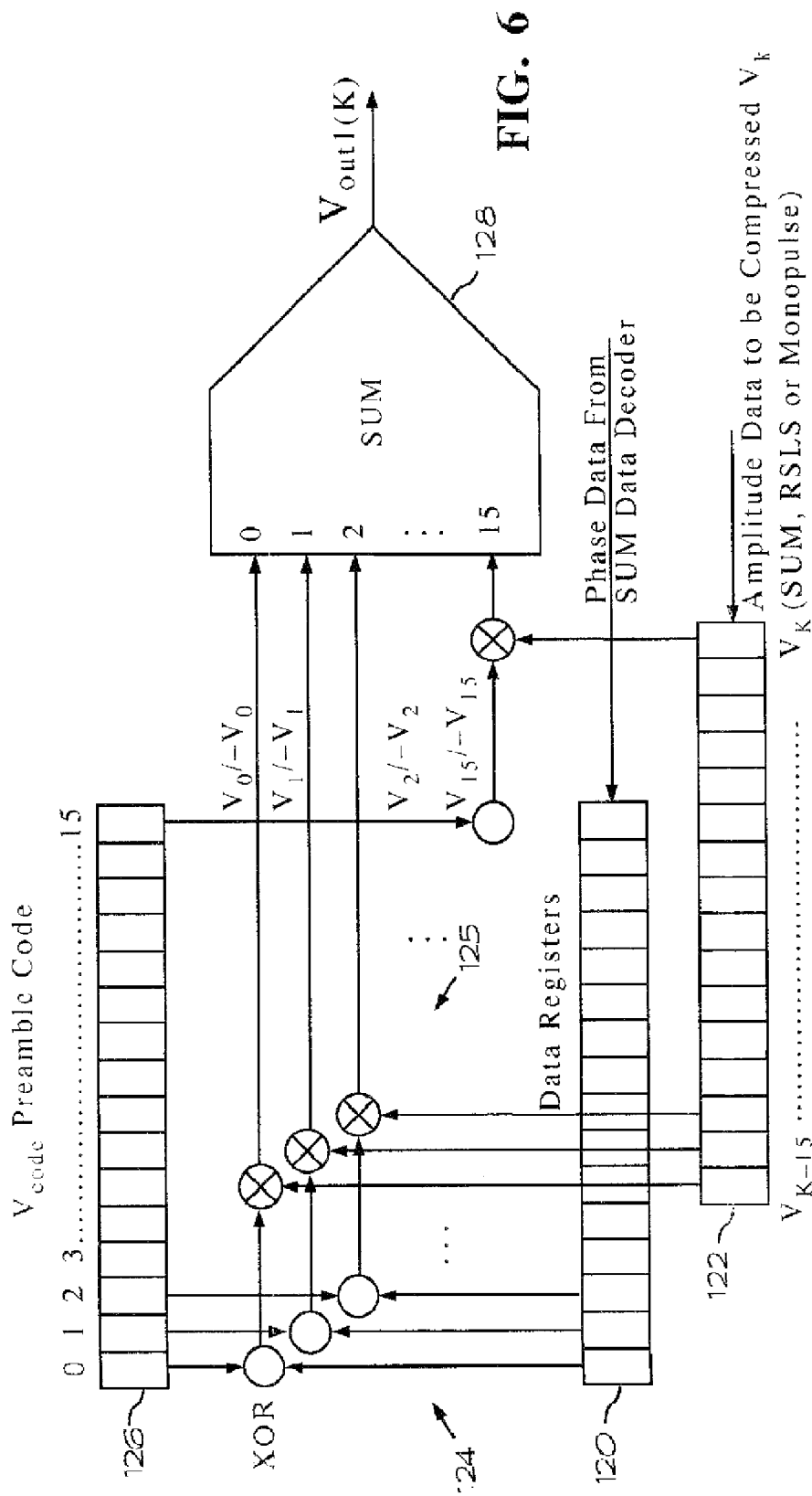
FIG. 6 is a block diagram of preamble amplitude compression system that may be included in the invention as shown in FIG. 1.

Phase Amplitude correlation may be considered as a match filter that maintains the processing gain by compressing the preamble data using the known correlation code. The process is illustrated in FIG. 6. FIG. 15 graphically illustrates preamble amplitude compression.

The phase amplitude correlation (amplitude compression) is similar to the phase correlation with the addition of the amplitude data processing. For proper operation the amplitude data must be linear with sufficient number of bits to support the needed dynamic range. The correlation process utilizes the phase data to establish the sign of each chip that is used by the correlator sum in correlation process.

Phase data and amplitude data to be compressed are input to FIFO registers 120 and 122, respectively. An array of XOR gates 124 compares the data in the FIFO register 120 and to a preamble code mask that is stored in a register 126. A multiplier array 125 forms the product of the output of the code mask register 126 and the corresponding bits of the FIFO register 122 and provides the result to a 16-bit summer 128, which produces a signal $V_{out1_k}$.

Let each data chip, k, be represented by the phase and amplitude $\phi_k$ and $V_k$. The Phase Amplitude correlation process at increment time k is performed by the XOR' function for coherent sum (Voutk) of all 16 chips preceding the time k.

$$Vout_k = \sum_{i=0}^{15} V_{k-i} * Sign_{15-i}.$$

Sign value is calculated from the XOR' function as given below:

$$Sign_{15-i} = \phi_{k-1} XOR' V_{code(15-i)} \; i=0 \text{ to } 15$$

Where $\phi_{k-i}$=The phase data (1/0) stored in each cell in the data register starting from k and going back 16 chips;

$V_{CODE(i)}$=The code data (1/0) stored in each Code register cells (preamble code); and XOR'=is modified XOR function where the output is +1 when the code and data in the cell matches and −1 when no match exists.

The results of this correlation process is the preamble matched filter "compressed" signal amplitude with the processing gain as provided by the correlation function. Assuming a coherent process with no loss the theoretical processing gain limit is 12 dB.

A similar process is performed in the OMNI and DIFF channels. The SUM phase chips and the fixed preamble codes generate the compression code that, when applied on the OMNI and DIFF amplitude signal, will provide the PG amplitude data needed for RSLS and monopulse.

Preamble Decision Logic 48

Figure 7:
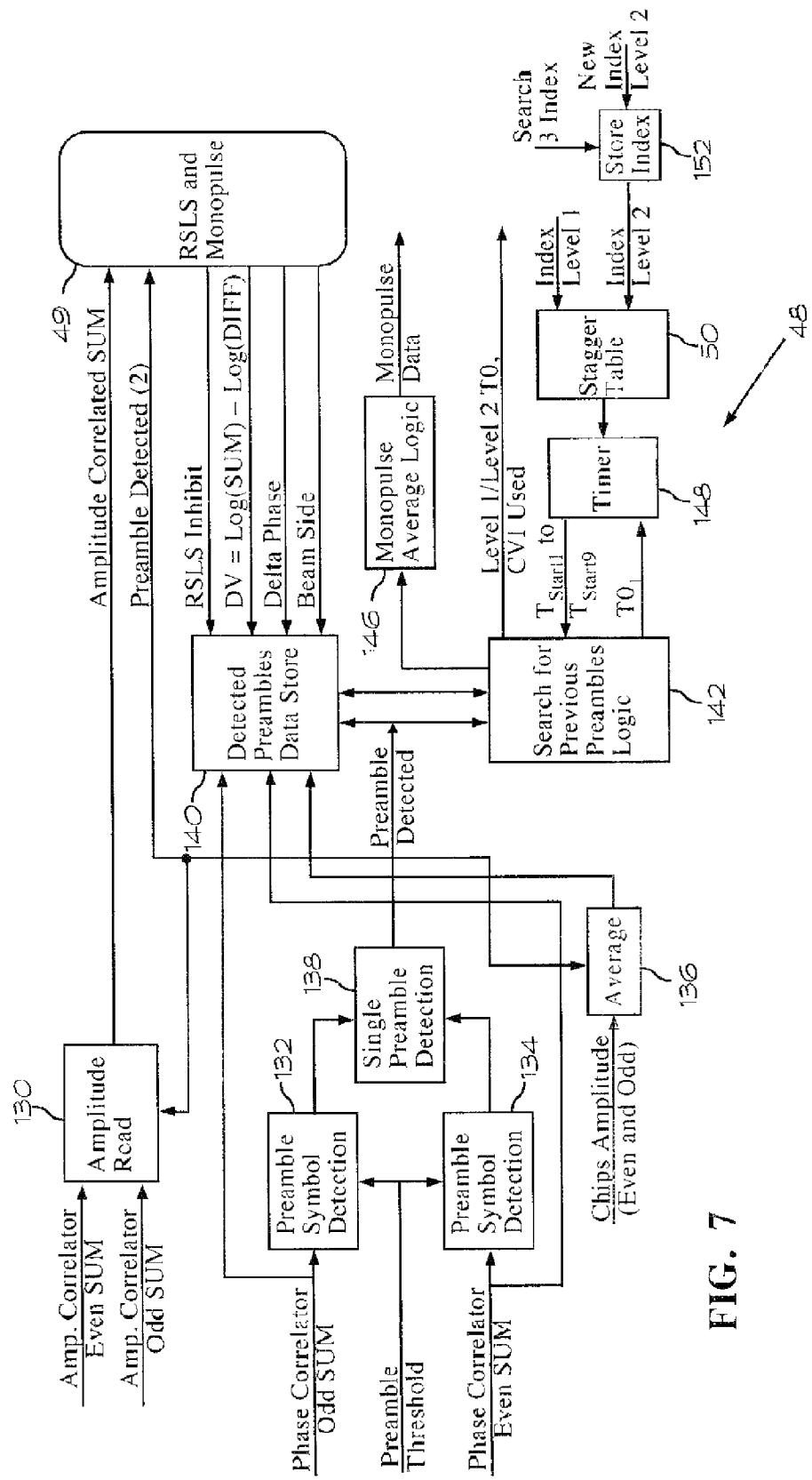
FIG. 7 is a block diagram of a preamble decision logic system that may be included in the system of FIG. 1.

The Preamble decision logic illustrated in FIG. 7 provides two main operations: preamble detection and support to monopulse calculation. The amplitude Even Sum from the even amplitude correlator 116 and the amplitude Odd Sum from the odd amplitude correlator 117 are input to an amplitude reader 130. The phase Odd Sum from the odd phase correlator 42 is input to a preamble symbol detector 132, and the phase Even Sum from the even phase correlator 46 is input to a preamble symbol detector 134. The preamble symbol detectors 132 and 134 both receive a preamble threshold signal and provide output signals to a single preamble detector 138.

The phase Odd Sum signal and the phase Even Sum signal are also input to a detected preambles data store 140. The detected preambles data store 140 receives the Odd and Even SUM phase and amplitude correlated data as provided by the correlators 40, 42, 44 and 46 and evaluates the data for possible preamble detection. Once a new preamble symbol is detected, the function searches for possible other preambles and identifies, based on the preamble spacing and the incoming data type as level 1 or level 2. This information is used to generate a T0 trigger signal that starts the data decoding process of both the Odd and Even channels 26 and 28.

The Preamble decision logic 48 finalizes the RSLS and monopulse calculation. When a new preamble is detected, it is reported to the RSLS and Monopulse function 49, which returns, for this preamble, a RSLS inhibit pulse, a monopulse signal, DV, and the beam side information. This data is used here for the final preamble monopulse estimates.

The phase and amplitude SUM signals output from the correlator 38 contained in the correlated Even and Odd phase and amplitude data streams are evaluated here for possible preamble detection. For that, the current phase correlated odd and even inputs (absolute value) are each tested by the preamble symbol detection 138. When at least one of them exceeds the threshold, a Preamble Detected strobe signal is generated. This strobe signal activates series of events. First it activates an Average 136 function that averages the chip amplitude samples prior to the preamble detection time to calculate the amplitude of the current preamble. Next it starts a search for other preambles process 142 stored in the Detected Preambles Data Store 140 to determine level 1 and 1 and level 2 detection. Then it records the Correlated Even and Odd SUM amplitude as received from the amplitude correlator process and reports it to the RSLS and Monopulse 49 where the preamble RSLS inhibit strobe and monopulse data associated with the current preamble are calculated. Finally it stores all data pertained to the current preamble in the Detected Preamble Data Store 140 for future use. The Preamble Detection strobe is 1 or 2 indicating whether the Odd or Even channels shall be used for this preamble symbol.

The Average function 136 searches back in time for N chips (default value N=8) and calculates for the Odd and Even channels, the average level of the current detected preamble. This data is needed for the final validation of the preamble detection set.

The preamble Search for Previous Preamble Logic 142 searches for other possible preambles by "looking" back in time for possible existence of P1 preambles in level 1 and P3, P2 and P1 for level 2 detections. For that, a delay line of minimum length equal or greater to the maximum signal length including the largest CVI must be implemented. This time is set by the level 2 signal length that is 26.625 μsec plus maximum value of S1 of 2.875 μsec for total delay time of at least 28 μsec.

When searching back from the current position, all combinations of P2 preambles in level 1 and P3, P2 and P1 preambles in level 2 must be evaluated. The preamble search is performed on the expected preamble position as set by the CVI, CVI−1 and CVI+1 staggering and the search is evaluating possible of level 1 and level 2 preambles existence (it is possible that the new preamble may result with both Level 1 and Level 2 valid solutions, most likely only one of them is true). To offset any possible sampling error, the search must be performed on the current cell and on plus and minus on cell from the current cell. The search is done independently on the Even and Odd channels. If any of the searches results in successful decision, a data strobe at position T0, indicate possible data, is reported. It should be noted that due to the dual Odd and Even channels, it is possible that the same target will be marked twice, offset by half chip length. A proper algorithm is later provided to group the two reports into a single one.

The level 1 search logic is given below:
Record the amplitude of the current preamble by averaging on 8 data cells prior to the time mark by the correlator.
Start from the new preamble and search back in time:
Loop on the three CVI (CVI, CVI−1, CVI+1) stagger time
For the current stagger time and for the 3 locations, TStart−1, TStart and Tstart+1
If preamble is stored and not marked by RSLS inhibit bit,
Read the average amplitude of the stored preamble. If amplitude is within 3 dB of the current preamble, level 1 detection is declared. Calculate the position of T0 (D1 end) and calculate the monopulse data.

The position of the location where P1 may occur, iStart relatively to the P2, k, is calculated from the expression.

$$i=k-(3.0+S1)/0.0625)-1;$$

S1—The stagger position as reported by CVI, CVI−1 and CVI+1

Level 2 Search

Record the amplitude of the current preamble by averaging on 8 data cells prior to the time mark by the correlator.

Start from the new preamble and search back in time:

Loop on the three CVI (CVI, CV−1, CV+1)

First Assumption search—The detected pulse is assumed to be P4 (3 out of 4 must be detected)

For each CVI Loop on three possible delay locations, Tstart, Tstart−1 and Tstart+1 as defined by P3 position. If detection occurs, record the detection.

For each CVI Loop on three possible delay locations, Tstart, Tstart−1 and Tstart+1 as defined by P2 position. If detection occurs, record the detection.

For each CVI Loop on three possible delay locations, Tstart, Tstart−1 and Tstart+1 as defined by P1 position. If detection occurs, record the detection If at least 2 out of 3 preambles are detected fined the maximum and minimum amplitude of the detected preambles and if the minimum to maximum amplitude is larger than 0.5, level 2 detection is declared.

Calculate the position of T0 (D1 end) and calculate the monopulse data (described below).

Second Assumption search—The detected pulse is P3 (all 3 must be detected)

For each CVI Loop on three possible delay locations, Tstart, Tstart−1 and Tstart+1 as defined by P2 position. If detection occurs, record the detection.

For each CVI Loop on three possible delay locations, Tstart, TStart−1 and Tstart+1 as defined by P1 position. If detection occurs, record the detection.

If both P2 and P1 preambles are detected fined the maximum and minimum amplitude of the detected preambles and if the minimum to maximum amplitude is larger than 0.5, a level 2 detection is declared.

Calculate the position of T0 (D1 end) and calculate the monopulse data (described below).

It should be noted that when all 4 preambles exist, the second assumption will be first decoded and then overwritten later by the first assumption. The starting search positions, i, for P1, P2 and P3, k cell from P4 are given as:

$$i=k-(26.625+S1)/0.0625)-1;$$

$$i=k-(17.250+S2)/0.0625)-1; \text{ and}$$

$$i=k-(5.000+S3)/0.0625)-1;$$

The start search position, i, for P1 and P2 relatively to P3 is given as:

$$i=k-(21.625+S1-S3)/0.0625)-1; \text{ and}$$

$$i=k-(12.25+S2-S3)/0.0625)-1;$$

For each level 2 preamble decision the CVI used to detect this preamble must be recorded and sent to the data process so the proper spreading function can be used during data process.

The RSLS and monopulse process 49 is activated when the Preamble Detected strobe is detected. First the Amplitude Correlated SUM, as reported by the correlation function, is recorded. The function selects from the Even and Odd amplitude the one with the larger correlation and uses it as the SUM signal (it is possible that due to sample and phase relationship, only one channel will be properly correlated). The selected amplitude sum and the Preamble Detected strobe are now reported to the RSLS and Monopulse process. This function calculates the RSLS inhibits pulse, the monopulse beam side, the phase difference associated with this beam side and the monopulse signal DV, where:

$$DV=\text{Log 2(SUM)}-\text{Log 2(DIF)}.$$

This data is recorded and stored in the Detected Preambles Data Store with the Even and Odd preamble data recorded for the current preamble.

When the Search for Previous Preambles Logic scans the Detected Preamble Data Store for other preambles, it ignores preambles marked by the RSLS as being from the sidelobes. However, when a valid preamble is detected, it extracts the monopulse data associated with this preamble. Once a level 1 or Level 2 preamble set is detected, the monopulse data recorded for that preamble set is processed by the Monopulse Average Logic and the final monopulse data is calculated.

Level 1, the monopulse data is calculated as follows (separate for the Even and odd channel): If the two preambles monopulse data are on the same side and if $$abs(DV1-DV2)<K1,$$

the two preambles are from the same azimuth and the monopulse azimuth signal shall be:

$$DV = \frac{DV_1 + DV_2}{2}.$$

These values as well as the beam side data shall be reported with the T0 pulse.

If the monopulse data does not meet these requirements the monopulse azimuth data shall be ignored and a "failed" monopulse data shall be reported. For level 2, the 3 or 4 preambles as were identified by the search process shall be evaluated as follows: All preambles that are on the same side are grouped together. For each group having more than 1 member, if the larger (DVmax) is not more than K2 larger than the smaller (DVmin) the set is assumed to be from the same target; and the DV is the average of the entire group and the monopulse azimuth data is reported. If more than on group meets the above requirement, but are from different sides, monopulse data are ignored and "failed" monopulse is reported. If none of the groups in any channel meet the above criteria, reject the monopulse data and report "failed" monopulse. The monopulse information shall be attached to the T0 strobe allowing it to be part of the data set reported to the system.

RSLS and Monopulse Process 49

Figure 8:
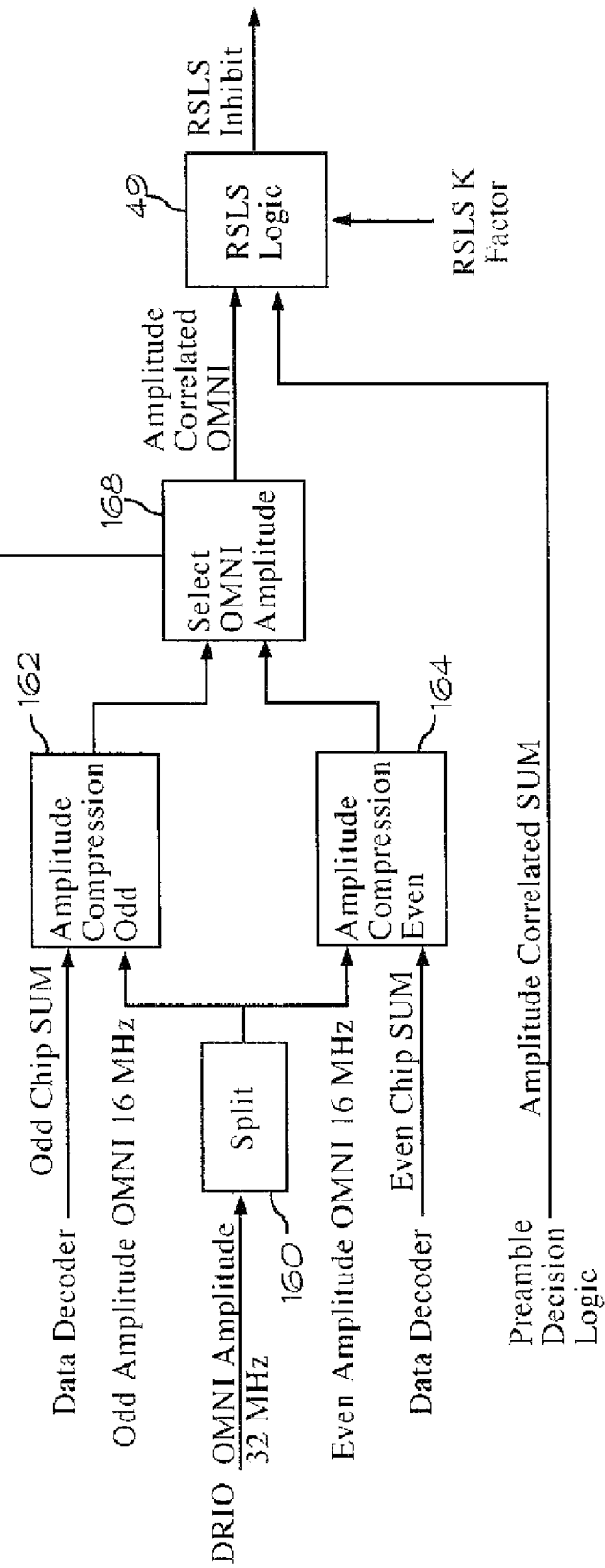
FIG. 8 is a block diagram of a reply side lobe suppression system that may be included in the system of FIG. 1.
Figure 9:
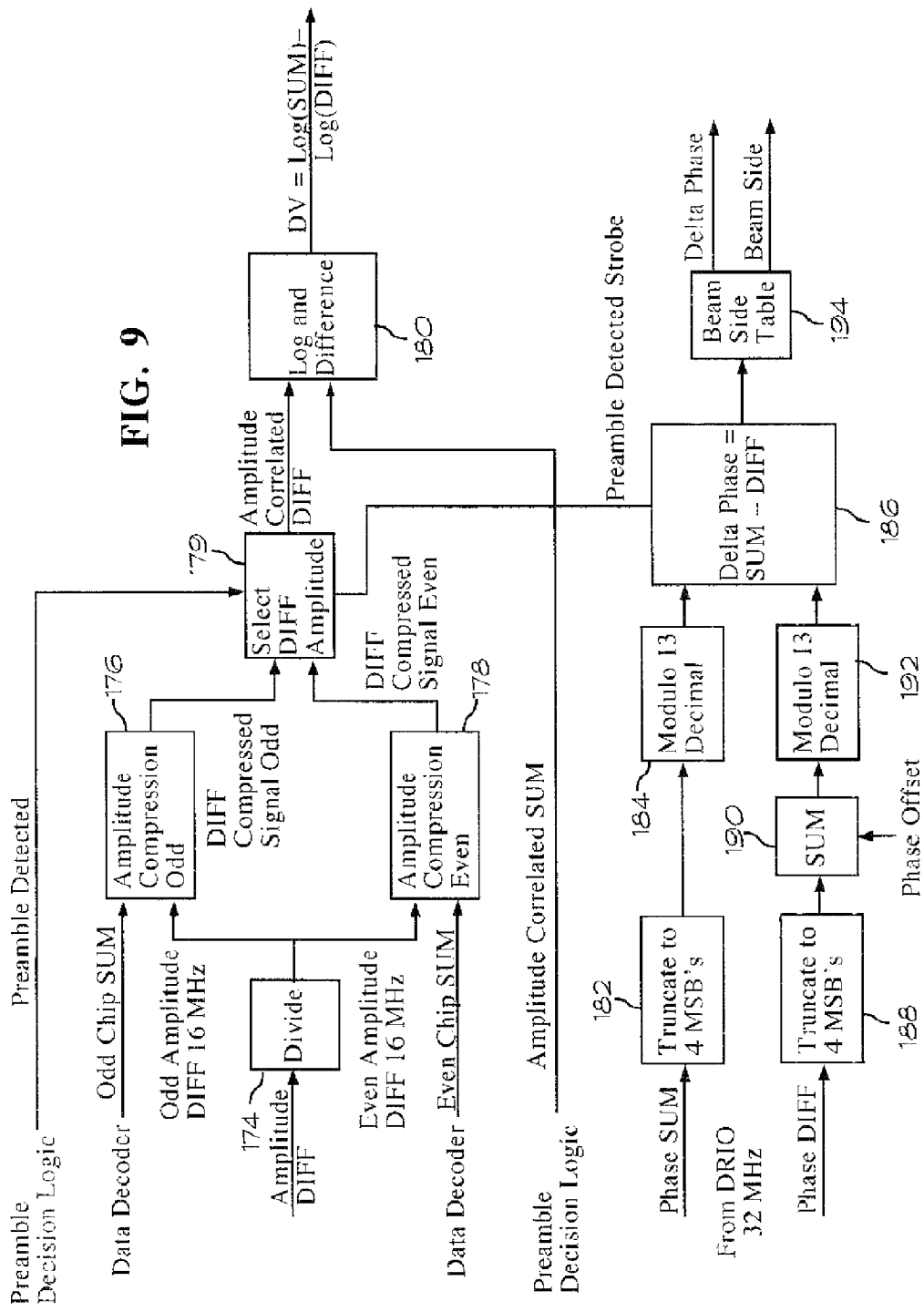
FIG. 9 is a block diagram of a monopulse process that may be used in the system of FIG. 1.
Figure 10:
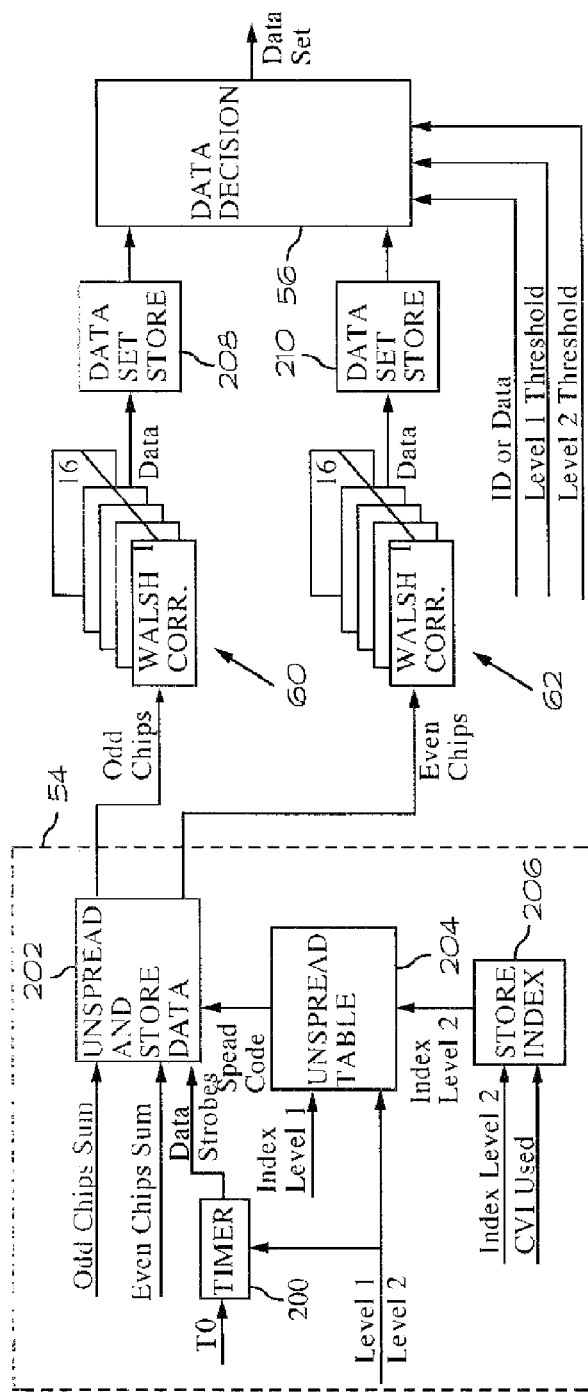
FIG. 10 illustrates a Walsh data correlator and data decoder that may be used in the system of FIG. 1.

The RSLS and Monopulse process shown in FIGS. 8 and 9 operates in conjunction with the Preamble decision logic 48 to generate the RSLS and monopulse data. It calculates the single preamble symbol RSLS status and the monopulse value for this preamble and reports it back to the Preamble decision logic 48 where this data is evaluated, and the final monopulse for the entire preamble set associated with any given data item is calculated and reported. The RSLS inhibit pulse generated here prevents preambles detected by the sidelobes to be used in the process.

The RSLS function accepts the OMNI (or any reference) antenna amplitude data as provided by the receiver 22 at 32

MHz rate and by comparing the OMNI level to the SUM level it make the determination weather the signal is from a main beam or from the sidelobes.

The RSLS process illustrated in FIG. 8 receives the 32 MHz OMNI amplitude signal from the receiver 22. A splitter 160 splits this signal is into two 16 MHz odd and even channels that are fed to amplitude compression odd and even functions 162 and 164, respectively, where the signal is compressed to provide additional PG S/N improvement. The SUM phase chips as generated by the Data decoders 32 and 34 and the fixed preamble code are used for the OMNI amplitude signal compression. The Odd and Even compressed data is now fed to a Select OMNI Amplitude function 168 where the Odd and Even OMNI signals are gated by the Preamble Detected strobe signal received from the Preamble decision logic 48. When a preamble is reported by the Preamble decision logic 48, the Compressed Odd and Even OMNI signals are evaluated, and the stronger of the two is used for the RSLS process 49. This function is needed since in some cases, where the phase transition occurs at unique sample places, only one of the channels may provide proper compression. Finally, the OMNI signal, which is now compressed to provide improved S/N ratio, is compared to the SUM compressed signal as provided by the Preamble decision logic. The RSLS gate 49 decision level is set by the RSLS threshold (K Factor) to be an operator selectable value of 3 dB to 18 dB, which equate to the SUM to OMNI ratio to be 1.41 to 7.94.

The RSLS function operates on each preamble as reported by the Preamble decision logic 48. When the RSLS gate is activated and reported to the Preamble decision logic 48, that preamble will be rejected by it and if a sufficient number of preambles is rejected (one in level 1 and at least two in level 2), the data associated with this preamble set will not be considered for data reporting. It is not advisable to use the RSLS 49 to reject the entire data set because it is possible that in this data set a valid preamble set may exist. The advantage of using compression versus simple non-coherent integration of the entire preamble pulse (for improving S/N) is that the time resolution is maintained while the S/N is improved, allowing for closely spaced reports to be processed independently.

When using the RSLS Gate 49 output, the timing should be carefully evaluated to guarantee that the gate actually overlaps the preamble expected position.

The monopulse process illustrated in FIG. 9 receives the 32 MHz DIFF channel amplitude and phase signals from the receiver 22, calculates the preamble monopulse signal needed for the monopulse beam estimate, and reports it back to the preamble decision logic 48 where it is further smoothed to generate the proper signal for the monopulse table addressing.

The 32 MHz DIFF amplitude signal input from the receiver 22 is split in to two channels, Odd and Even. Each channel signal is compressed using the Even and Odd Chip SUM signal and the fixed preamble code are stored in the Amplitude Compression Odd and Even functions 176 and 178, respectively. The DIFF compressed amplitude Odd and Even signals are fed to a Select DIFF Amplitude function 179, which compares the two signals and selects the higher one for the output. The Selected DIFF Amplitude 179 also receives a Preamble Detected strobe from the Preamble decision logic 48, indicating that a preamble was detected, and it will report the Selected DIFF Amplitude only when a preamble exists. A Log and Difference function 180 converts the SUM and DIFF correlated signal to log base 2 values (scaling of which are as performed in the SIF monopulse data) and subtracts the two Log values to generate a difference signal DV:

$$DV = \log 2(SUM) - \log 2(DIF)$$

The DV signal is reported back to the Preamble decision logic 48 where it is used with other stored preamble data for the final DV calculation and smoothing.

The monopulse beam direction is calculated from the Phase SUM and the Phase DIFF signals received from the receiver 22. Truncating tables 182 and 188 truncate the 8 bit phase data to 4 bits using the 3 MSB of the reported phase. The DIFF phase is offset by a Phase Offset signal received from the system and calculated from targets of opportunity, to set the monopulse phase shift to approximately 0 and approximately 180 degrees, depending on the target beam side. Each phase channel is now truncated to phase reading modulo 13 having 27.692 degrees per LSB and a range of zero to 332.304 degrees. The phase difference Delta Phase is calculated as:

Delta Phase=Truncated Sum Phase−Truncated Difference Phase.

The Delta phase 186 is executed only when Preamble Detection Strobe received from the Preamble Detection Logic indicates that preamble was detected. At that time, the Delta Phase, as measured by the process, is recorded and reported. The Delta Phase signal will have theoretically two values, zero and 180 degrees (depending on the target beam side). However, due to noise and system error, the zero value can be drifting about plus or minus some its origin (where minus is represented as high positive number modulo 13 about 360 degrees). The 180 degrees value will be also drifting around the center value. The final beam side selection is decided by a 256 Beam Side Table that outputs "0" or "1" based on the Delta Phase values. The Beam Side signal and its associated Delta Phase are reported back to the Preamble decision logic 48 for further processing. The Delta Phase, which seems to be redundant here is maintained in order to allow for a separate Mode 5 Phase Offset calculation to be performed by the system. That may be needed if the mode 5 system will use a different IF channel than the SIF process.

Walsh Data Correlator System 52

The Walsh correlator system 52 receives the Odd and Even chip data string and the T0 strobe indicating where data is started. It performs correlation tests on both channels using the 16 bit Walsh correlators 60 and 62 identifying the data stored in the input string and finding the best data set to be reported to the system. The process illustrated in FIG. 10 comprises the input time process where the preamble data is used to extract the time pulses needed for the data correlation process and the correlation and decision processes where the input 16 bit chips data is correlated with the Walsh code function and the 4 bits data and the correlation values are extracted. Finally a decision process, where the best data set and the detection decision are executed.

The unspread process 54 includes a timer 200 that calculates, stating from the preamble time, the number of chips to be counted before symbols data is to be recorded. The position of D1 end relative to the preamble end (P2 for level 1 and P4 for level 2) is exactly 2.0625 μsec which equates, at 16 MHz sampling rate, to 33 chips. However, the preamble decision is completed prior to the last 3 run out chips making the total chip count from the preamble decision point to the end of D1 to be 36 chips. In order to back it up to the beginning of D1, the start D1 is 18 chips prior to that, resulting in 18 chips count from the preamble decision point. The timer set also the number of symbols to be recorded, 9 for level 1 and 33 for level 2.

Start Cell=Preamble Cell+18.
Symbols=9 for Level 1
33 for Level 2

The timer 200 now generates strobes that mark the location of the symbols to be recorded. These symbols are processed one at a time by the Unspread and Store Data function 202 where the data is unspread using the spreading function received from an Unspread Table 204. This table, which stores all 256 spreading functions, is indexed by the level 1 or level 2 index as reported by the system, and the proper spreading function is selected. For level 1, the index as reported by the system is used directly. In the case of level 2, the index selected is one of the 3 possible indexes stored in a Store Index table 206 and is selected by the CVI Used signal reported by the preamble. The spreading process is a bit-by-bit modulo 2 addition with no carry of the spreading code with the symbol data.

for (i=0; i<16; i++)
//Extract a single bit
Bit=Spreading Function & 0x00000001;
Symbol[15-i]=Symbol[15-i]+Bit;
if (Symbol[15-i]==2)
Symbol[15-i]=0;
Spreading Function=Spreading Function>>1;

In order to offset any possible sampling error, the process is performed at the time as marked by the preamble and for plus and minus one chip location offset from that T0 position. The three data sets are now stored in the Unspread and Store function for correlation process.

Data Correlation

The Walsh Correlator function 52 correlates input Data as stored in the data register 54 (after unspreading) with the 16 Walsh codes to find the best matching. The correlation function can be written as:

$$Vout_{(K)} = \sum_{N=0}^{15} V_{DATA(N)}(XOR')V_{CODE(N)},$$

where
$V_{DATA(N)}$=The data stored in each cell in the data register,
$V_{CODE(N)}$=The code stored in each cell Direct or Inverse Code register, and
XOR'=+1 when the code and data in the cell matches and
−1 when no match exist Each symbol is correlated with all the 16 Walsh codes, and the highest correlation value is used to decide the content of the 4 data bits of that symbol. The process is performed on all symbols and the correlation value of each symbols as well as correlation sum is stored in the data. The process is repeated for plus and minus 1 chip position and on the Odd and Even channels. Thus a total of 6 tests are performed on the data set (Odd and Even sets, three positions on each set).

The Walsh correlation uses a special set of codes that provides the best possible separation between data set.

--- char Walsh[16][16] ={ {1,1,1,1, 1,1,1,1, 1,1,1,1, 1,1,1,1}, {1,1,1,1, 1,1,1,1, 0,0,0,0, 0,0,0,0},
{1,1,1,1, 0,0,0,0, 0,0,0,0, 1,1,1,1}, {1,1,1,1, 0,0,0,0, 1,1,1,1, 0,0,0,0},
{1,1,0,0, 0,0,1,1, 1,1,0,0, 0,0,1,1}, {1,1,0,0, 0,0,1,1, 0,0,1,1, 1,1,0,0},
{1,1,0,0, 1,1,0,0, 0,0,1,1, 0,0,1,1}, {1,1,0,0, 1,1,0,0, 1,1,0,0, 1,1,0,0},
{1,0,0,1, 1,0,0,1, 1,0,0,1, 1,0,0,1}, {1,0,0,1, 1,0,0,1, 0,1,1,0, 0,1,1,0},
{1,0,0,1, 0,1,1,0, 0,1,1,0, 1,0,0,1}, {1,0,0,1, 0,1,1,0, 1,0,0,1, 0,1,1,0}, -continued {1,0,1,0, 0,1,0,1, 1,0,1,0, 0,1,0,1}, {1,0,1,0, 0,1,0,1, 0,1,0,1, 1,0,1,0},
{1,0,1,0, 1,0,1,0, 0,1,0,1, 0,1,0,1}, {1,0,1,0, 1,0,1,0, 1,0,1,0, 1,0,1,0} }

---

Figure 11:
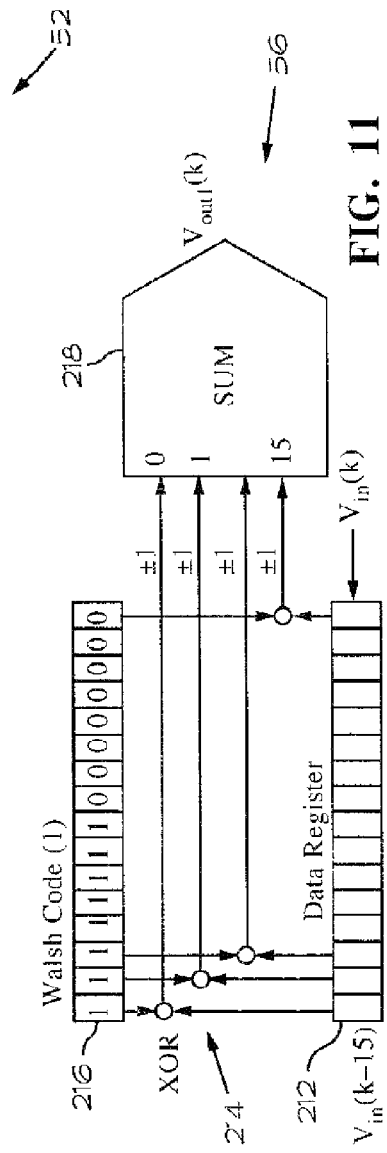
FIG. 11 is a block diagram of a section of the data correlator of FIG. 10.

A single correlator, 16 of which are implemented for each channel, is illustrated in FIG. 11. FIG. 11 shows one section of the Walsh data correlator 60. The data correlation process is performed starting from the expected time of the first data symbol D1 on all symbols, one at a time. The data $V_{in}(k)$ is input to a data register 212. The Walsh code is stored in a code register 216. A 16-bit XOR array 214 compares the content of the corresponding bits of the input data to the Walsh code. The outputs of the XOR functions are input to a summer 218 that provides an output signal $V_{out1}(k)$.

The data order and the Walsh code order (most to list) must be carefully matched. It should be noted that due to the bipolar values of each individual correlation the correlation sum for false target tend to converge to 0 while the true target sum will converge to positive or negative value (depending on the data being in phase or invert). The maximum absolute correlation value is |9×16=144| for level 1 or |33×16=528| for level 2.

The odd and even data set and the associated correlation results for each symbol and the correlation sum for each set are stored in the Data Set Store function which interfaces to the Data Decision process that selects the final data set to be reported.

Data Decision Process 56

The Data Decision function reads the correlator sum output from all the tests and for both, the odd and even channel, and makes the final determination on the acceptance or rejection of a data item. The correlation sum (absolute value) is compared to the level 1 or level 2 threshold and if it passes the test a data set is accepted as valid. When more than one set is above threshold, the set with the highest correlation value is selected and reported to the outside world. This threshold level, combined with the preamble threshold setting defines the system false alarm, Pfa, and the detection probability, Pd.

Typical results for level 1 and level 2 data set, as recorded form the simulation. The level 2 and level 1 data set, the preamble trigger and the correlation result strobe are shown as function of time. The level 2 report has correlation level of 162 typical for low 10 dB S/N target. The level 1 target S/N of 16 dB correlation level is 144 (maximum possible value).

Due to the split process target decision may appear in two consecutive cells (contributed by the Odd and Even channel). In order to prevent reporting such target twice a simple algorithm that tests the data in the next cell, and select the larger of the two was implemented. It tests the score of the current and the next cell and loaded the current cell if the score is larger and increment the counter by 1 to skip the next cell.

--- if ( abs(DetectedData[i].Score) >= abs(DetectedData[i|1].Score))
    DataDecision[i] = Level1Detection;    i = i + 1.

---

EDAC Process 58

Figure 12:
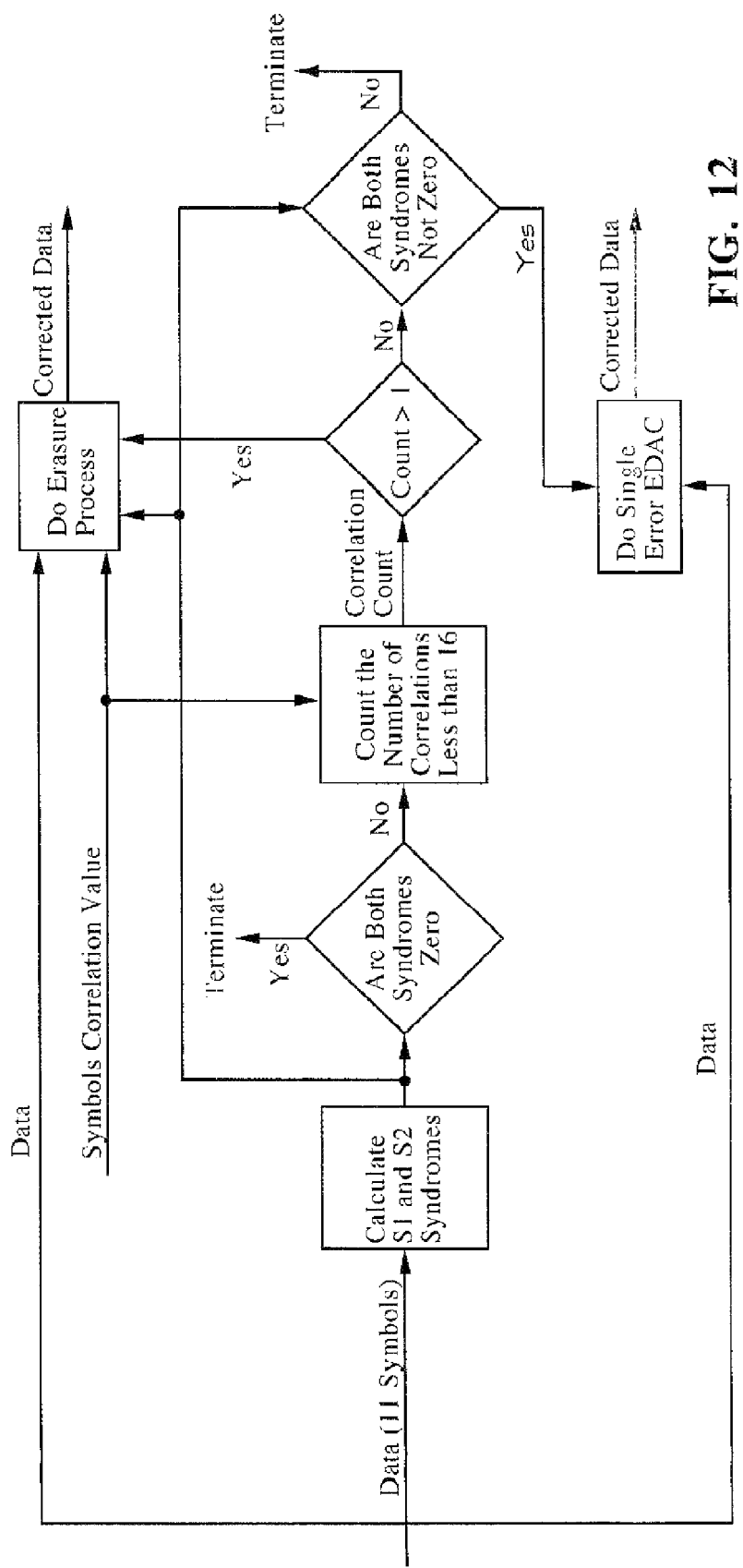
FIG. 12 is a flow diagram of an erasure and single error detection and correction process that may be used in the system of FIG. 1.

The EDAC process shown in the flow diagram of FIG. 12 is executed on level 2 data sets as reported by the Walsh Data Correlator 52. The EDAC 58 can identify location and correct one erroneous symbol in a group of 11 symbols or two erroneous symbols if the error location is known. To support this function, the level 2 data is organized in three groups of 11 symbols each, allowing the EDAC function to be executed on each group at a time.

The Walsh Data Correlator 52 reports each group of 11 symbols to the EDAC process 58. In order to assess the level of error, an S1 and S2 values, called syndromes, are calculated for each group of 11 symbols and the correlation level of each symbol, as was recorded by the Walsh correlator, is evaluated. The sequence of events is listed below is also illustrated in FIG. 13.

The two syndromes S1 and S2 are calculated. If both syndromes are zero, the EDAC process is terminated and no correction is applied on the data.

If one or both of the syndromes are not zero and at least two symbol correlation values are less than 16, the erasure process is applied. The location of the two erroneous symbols (needed for erasure process) is defined as the symbols with the lowest score. If more than two symbols have the same lowest score, a random selection of two lowest score symbols are used. The data set is corrected by the erasure process and the function returns to the calling function.

If both S1 and S2 syndromes are non-zero and not more than one correlation value is less then 16, a single error EDAC process is applied. The 11 symbols data set is corrected by the process and the function returns to the calling function.

The Mode 5 level 1 and level 2 symbol set is reported to a crypto computer 60, which decrypts the data and returns the tactical information required for Mode 5 IFF.

FIG. 13 shows a signal output from the receiver 20. The signal begins with preamble information and then presents data to be used in ATC. FIG. 14 shows a preamble phase correlator output corresponding to the receiver output signal of FIG. 13. FIG. 15 shows the preamble amplitude compression signal.

Figure 16:
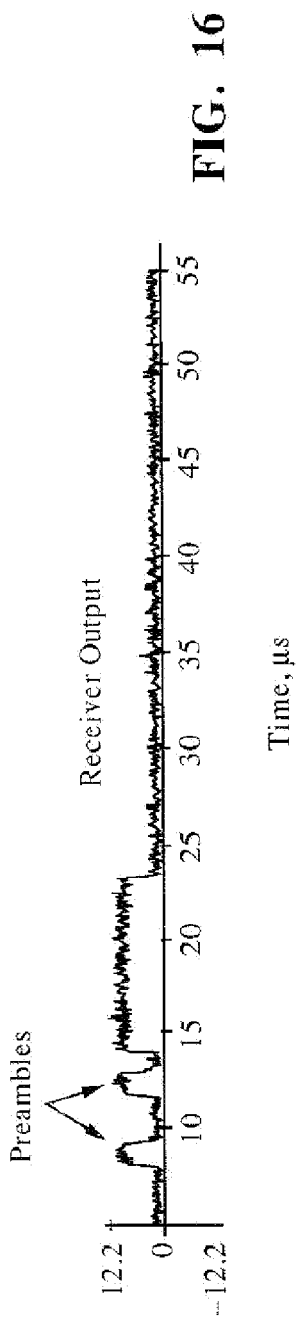
FIG. 16 graphically illustrates signals output from an external receiver that may be included in the system of FIG. 1.
Figure 17:
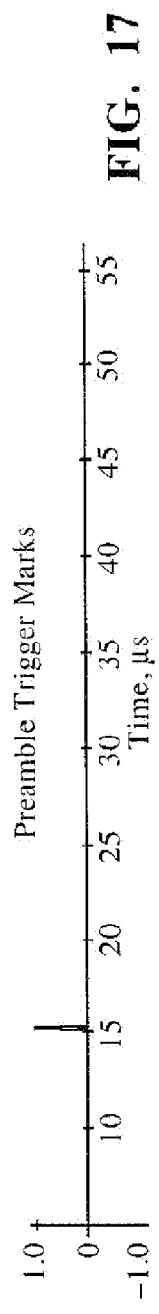
FIG. 17 graphically illustrates preamble trigger marks.
Figure 18:
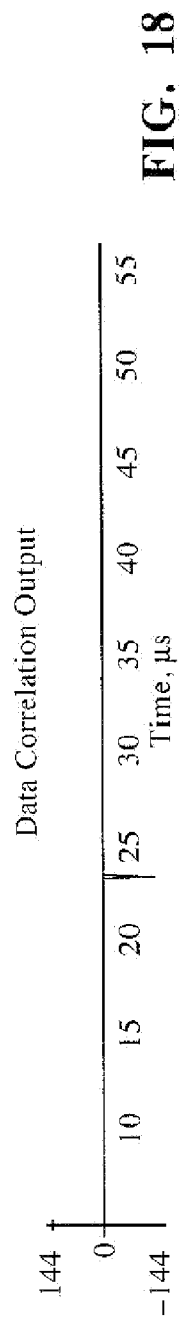
FIG. 18 graphically illustrates a signal output from the data correlator of FIG. 11.
Figure 19:
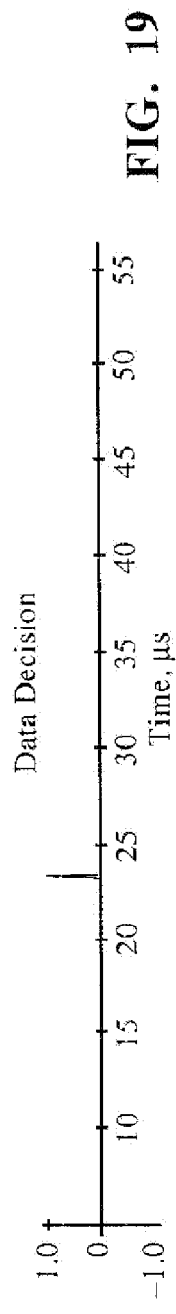
FIG. 19 graphically illustrates a data decision signal that results from a data decision process in the Walsh data correlator and data decoder of FIG. 11.

FIG. 17 shows preamble trigger marks corresponding to the receiver output signal shown in FIG. 16. The receiver output has two level 1 preambles. The preamble correlator generates a preamble trigger mark, shown in FIG. 17, indicating that data may exist. This data is processed by the Walsh correlator 52, which provides a correlation value of 144 (FIGS. 18 and 19), the maximum possible for level 1 data. As a result, data decision strobe signals are generated, indicating validation of the data set.

Figure 20:
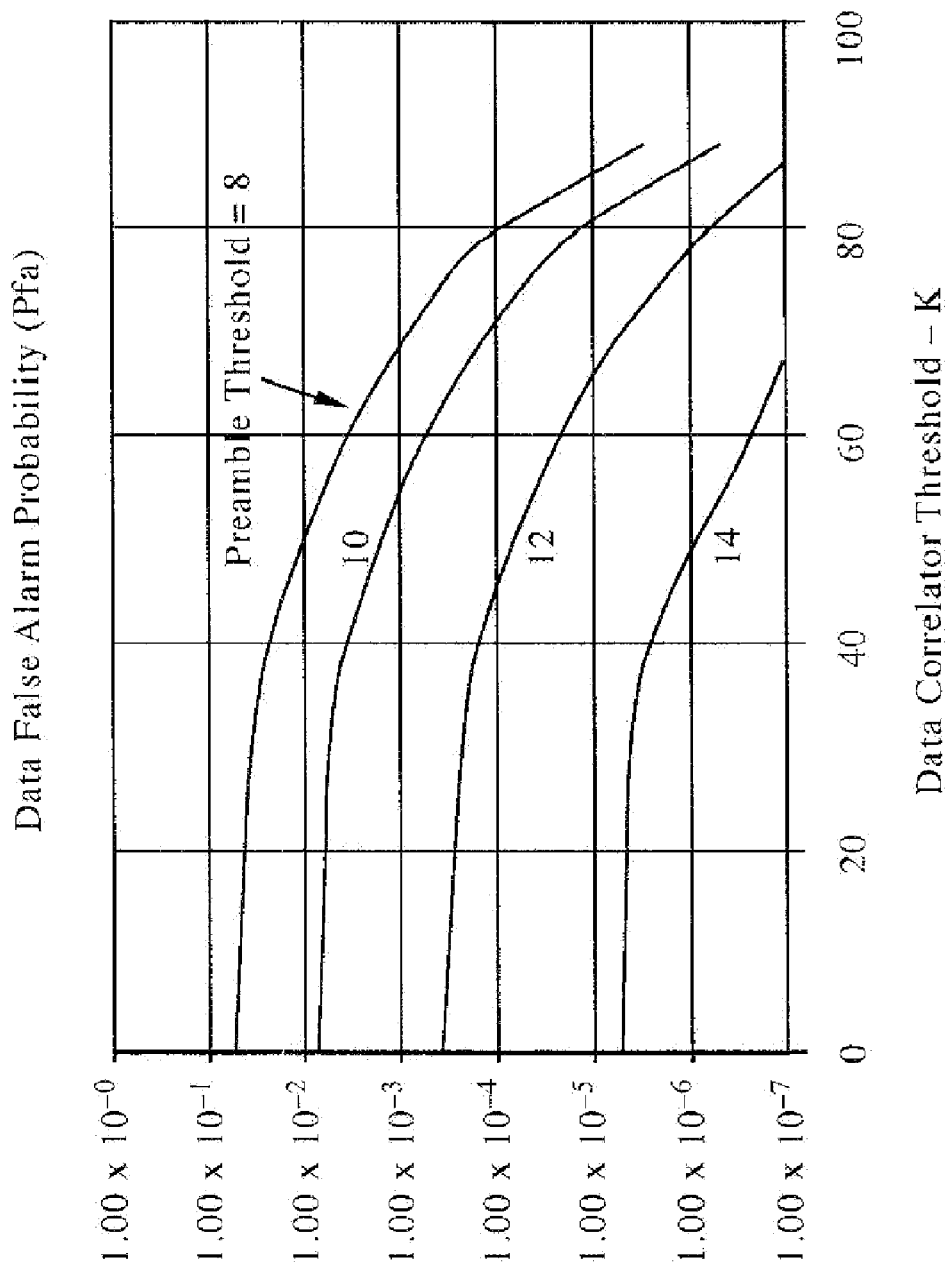
FIG. 20 graphically illustrates false alarm probability as a function of data correlator threshold for various values of the preamble threshold.

FIG. 20 shows false alarm rate data, which is set by the preamble threshold and the data threshold. The preamble threshold controls the number of preamble triggers that activates the data correlation process while the data threshold set the data correlation score at which data will be reported. FIG. 20 shows the false alarm probability, Pfa, as a function of the data threshold setting with the preamble threshold as a parameter. For a $10^{-7}$ Pfa setting (16 false reports per second at 16 MHz rate) the level 1 threshold setting should be 90 and the preamble threshold should be 12.

Figure 21:
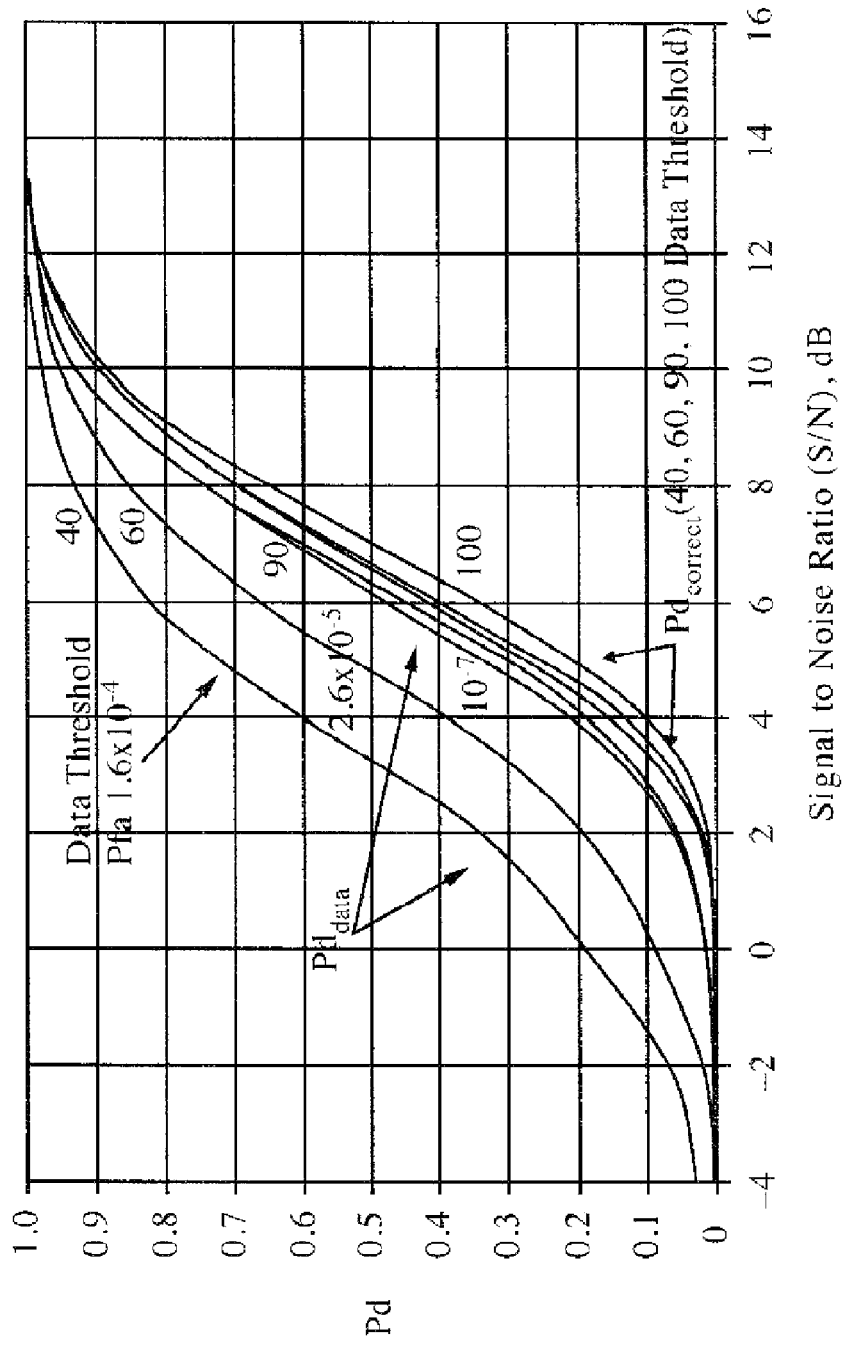
FIG. 21 graphically illustrates the detection probability Photodetector as a function of the ratio of the data signal to noise ratio.

FIG. 21 shows the detection probability Pd. The detection probability is a function of the ratio of the data signal to the noise (S/N ratio). Two types of detection probability are considered, the probability of detecting data based on the preamble decision, $Pd_{data}$, and the probability of having all data symbols correctly decoded, $Pd_{correct}$. These two level 1 probabilities as functions of the signal to noise ratio with data threshold setting as parameters are illustrated in FIG. 21. The preamble threshold setting for the graphs of FIG. 21 is 12.

What is claimed is:

1. An air traffic control system for processing a digital data stream containing a preamble and flight information data transmitted from an aircraft, comprising:
   a receiver for receiving digital radar signals from an aircraft, the receiver being arranged to provide amplitude and phase signal outputs;
   a signal splitter arranged to divide the amplitude and phase signal outputs from the receiver between an odd channel and an even channel that are arranged to carry a set of odd-numbered pulses and a set of even-numbered pulses, respectively;
   an odd channel data decoder connected to the signal splitter for extracting from signals encoded in the odd channel and forming an odd data stream
   an even channel data decoder connected to the signal splitter for extracting data from signals encoded in the even channel and forming an even data stream;
   a preamble correlator connected to the odd and even channel decoders for correlating the odd and even data streams with a predefined preamble mask and detecting potential valid preambles, the preamble correlator comprising;
      an odd channel amplitude correlator having a first input connected to the signal splitter to receive signals that indicate the odd channel amplitude and a second input connected to the odd channel data decoder to receive decoded odd signals, the odd channel amplitude correlator being arranged to produce an odd channel amplitude correlator sum signal;
      an odd channel phase correlator connected to the odd channel data decoder to receive signals that indicate the phase of odd channel signals, the odd channel phase correlator being arranged to produce an odd phase correlator sum signal;
      an even channel amplitude correlator having a first input connected to the signal splitter to receive signals that indicate the even channel amplitude and a second input connected to the even channel data decoder to receive decoded even signals, the even channel amplitude correlator being arranged to produce an even channel amplitude correlator sum signal; and
      an even channel phase correlator connected to the even channel data decoder to receive signals that indicate the phase of even channel signals, the even phase correlator being arranged to produce an even phase correlator sum signal;
   an odd channel differential phase detector in the odd channel between the signal splitter and the odd channel data decoder;
   an even channel differential phase detector in the even channel between the signal splitter and the even channel data decoder; and
   preamble decision logic arranged to process signals output from the preamble correlator and identify which of the potential valid preambles actually are valid.

2. The air traffic control system of claim 1, further comprising a reply path sidelobe suppression (RSLS) and monopulse radar signal processing circuit connected to the preamble decision logic and to the receiver for suppressing preambles generated by sidelobes in the data stream and for generating monopulse radar data.

3. The air traffic control system of claim 1, further comprising a Walsh data correlator system for identifying data in the even and odd channels and deciding which channel has the best data to be used for further processing.

4. The air traffic control system of claim 1 wherein each preamble phase correlator includes:
   a FIFO input register arranged to receive a data bits input from the corresponding data decoder;
   a correlator having a preset code stored therein;
   an exclusive OR gate array connected between the FIFO input register and the correlator, the exclusive OR gate array being arranged to multiply bits stored in the correlator by corresponding bits in the FIFO input register, producing results that indicate whether each data bit matches the corresponding bit in the code; and a summer arranged to add signals output from the exclusive OR gate array to produce a correlation result.

5. The air traffic control system of claim 1 wherein each of the amplitude correlators includes:
a first FIFO data register arranged to receive phase data from the corresponding data decoder;
a second FIFO data register arranged to receive amplitude data from the signal splitter;
a code mask register having a preamble code mask stored therein;
an array of exclusive OR gates arranged to compare data in the first FIFO register to the preamble code mask stored in the preamble code mask register;
a multiplier array arranged to form the products of the code mask bits in the preamble code mask register and the corresponding amplitude data bits in the second FIFO register; and
a summer arranged to form the sum of signals output from the multiplier array.

6. The air traffic control system of claim 1 wherein the preamble decision logic includes:
an amplitude reader arranged to receive sum signals from the even and odd channel amplitude correlators;
an odd preamble symbol detector arranged to compare a sum signal from the odd phase correlator to a preamble threshold;
an even preamble symbol detector arranged to compare a sum signal from the even phase correlator to the preamble threshold; and
a preamble detector connected to receive signals from the first and second preamble symbol detectors and arranged to produce a preamble detected signal indicating detection of a valid preamble; and
a detected preambles data store arranged to receive the preamble detected signal.

7. A method for processing a digital data stream containing a preamble and flight information data transmitted from an aircraft for air traffic control, comprising:
receiving digital radar signals from an aircraft, the receiver being arranged to provide amplitude and phase signal outputs;
arranging a signal splitter to divide the amplitude and phase signal outputs from the receiver between an odd channel and an even channel that are arranged to carry a set of odd-numbered pulses and a set of even-numbered pulses, respectively;
connecting an odd channel data decoder to the signal splitter for extracting from signals encoded in the odd channel and forming an odd data stream
connecting an even channel data decoder to the signal splitter for extracting data from signals encoded in the even channel and forming an even data stream;
connecting a preamble correlator to the odd and even channel decoders for correlating the odd and even data streams with a predefined preamble mask and detecting potential valid preambles;
forming the preamble correlator to include an odd channel amplitude correlator having a first input connected to the signal splitter to receive signals that indicate the odd channel amplitude and a second input connected to the odd channel data decoder to receive decoded odd signals;
arranging the odd channel amplitude correlator to produce an odd channel amplitude correlator sum signal;

forming the preamble correlator an odd phase correlator connected to the odd channel data decoder to receive signals that indicate the phase of odd channel signals;
arranging the odd phase correlator to produce an odd phase correlator sum signal;
forming the preamble correlator to include an even channel amplitude correlator having a first input connected to the signal splitter to receive signals that indicate the even channel amplitude and a second input connected to the even channel data decoder to receive decoded even signals;
arranging the even channel amplitude correlator to produce an even channel amplitude correlator sum signal;
forming the preamble correlator to include an even phase correlator connected to the even channel data decoder to receive signals that indicate the phase of even channel signals;
arranging the even phase correlator to produce an even phase correlator sum signal
placing an odd channel differential phase detector in the odd channel between the signal splitter and the odd channel data decoder;
placing an even channel differential phase detector in the even channel between the signal splitter and the even channel data decoder; and
arranging preamble decision logic to process signals output from the preamble correlator for identifying which of the potential valid preambles actually are valid.

8. The method of claim 7, further comprising the step of connecting a reply path sidelobe suppression (RSLS) and monopulse radar signal processing circuit to the preamble decision logic and to the receiver for suppressing preambles generated by sidelobes in the data stream and for generating monopulse radar data.

9. The method of claim 8, further comprising the step of providing a Walsh data correlator system for identifying data in the even and odd channels and deciding which channel has the best data to be used for further processing.

10. The method of claim 7, further connecting the steps of:
arranging each preamble phase correlator to include a FIFO input register arranged to receive a data bits input from the corresponding data decoder;
arranging each preamble phase correlator to include a correlator having a preset code stored therein;
arranging each preamble phase correlator to include an exclusive OR gate array connected between the FIFO input register and the correlator;
arranging the exclusive OR gate array to multiply bits stored in the correlator by corresponding bits in the FIFO input register, producing results that indicate whether each data bit matches the corresponding bit in the code; and
arranging each preamble phase correlator to include a summer for adding signals output from the exclusive OR gate array to produce a correlation result.

11. The method of claim 7, further comprising the steps of:
forming each of the amplitude correlators to include a first FIFO data register arranged to receive phase data from the corresponding data decoder;
forming each of the amplitude correlators to include a second FIFO data register arranged to receive amplitude data from the signal splitter;
forming each of the amplitude correlators to include a code mask register having a preamble code mask stored therein;
forming each of the amplitude correlators to include an array of exclusive OR gates for comparing data in the first FIFO register to the preamble code mask stored in the preamble code mask register;

forming each of the amplitude correlators to include a multiplier array for forming the products of the code mask bits in the preamble code mask register and the corresponding amplitude data bits in the second FIFO register; and forming each of the amplitude correlators to include a summer for forming the sum of signals output from the multiplier array.

12. The method of claim 7 further comprising the steps of:

forming the preamble decision logic to include an amplitude reader receiving sum signals from the even and odd amplitude correlators;

forming the preamble decision logic to include an odd preamble symbol detector for comparing a sum signal from the odd phase correlator to a preamble threshold;

forming the preamble decision logic to include an even preamble symbol detector for comparing a sum signal from the even phase correlator to the preamble threshold;

forming the preamble decision logic to include a preamble detector for receiving signals from the first and second preamble symbol detectors and arranged to produce a preamble detected signal indicating detection of a valid preamble; and forming the preamble decision logic to include a detected preambles data store for receiving the preamble detected signal.

* * * * *